United States Patent [19]
Sugiyama

[11] Patent Number: 5,392,284
[45] Date of Patent: Feb. 21, 1995

[54] MULTI-MEDIA COMMUNICATION DEVICE

[75] Inventor: Akira Sugiyama, Kawasaki, Japan

[73] Assignee: Canon Kabushiki Kaisha, Tokyo, Japan

[21] Appl. No.: 205,823

[22] Filed: Mar. 3, 1994

Related U.S. Application Data

[63] Continuation of Ser. No. 763,504, Sep. 20, 1991, abandoned.

[30] Foreign Application Priority Data

Sep. 20, 1990 [JP] Japan .................... 2-251195
Dec. 26, 1990 [JP] Japan .................... 2-414513

[51] Int. Cl.6 ........................ H04J 3/22; H04M 1/00
[52] U.S. Cl. ........................ 370/84; 370/112; 370/118; 379/96; 348/17
[58] Field of Search ............ 370/84, 79, 85.7, 110.1, 370/112, 62, 118; 358/85; 379/53, 96, 93; 348/14, 17, 552

[56] References Cited

U.S. PATENT DOCUMENTS

| | | | |
|---|---|---|---|
| 4,550,399 | 10/1985 | Caron | 370/118 |
| 4,751,699 | 6/1988 | Tarridec et al. | 370/84 |
| 4,864,562 | 9/1989 | Murakami et al. | 370/84 |
| 4,893,305 | 1/1990 | Fernandez et al. | 370/84 |
| 4,998,248 | 3/1991 | Matsuzaki | 370/110.1 |
| 5,005,170 | 4/1991 | Nelson | 270/112 |

Primary Examiner—Douglas W. Olms
Assistant Examiner—Hassan Kizou
Attorney, Agent, or Firm—Fitzpatrick, Cella, Harper & Scinto

[57] ABSTRACT

A multi-media communication terminal device includes a first information communication device for communicating the first information at a plurality of communication rates, a second information communication device for communicating the second information different from the first information at a plurality of communication rates a selection device for selecting the information concerning the communication rate to specify the communication rate of the first information, and a control device for selecting the communication rate of the second information based on the communication rate of the first information specified.

17 Claims, 20 Drawing Sheets

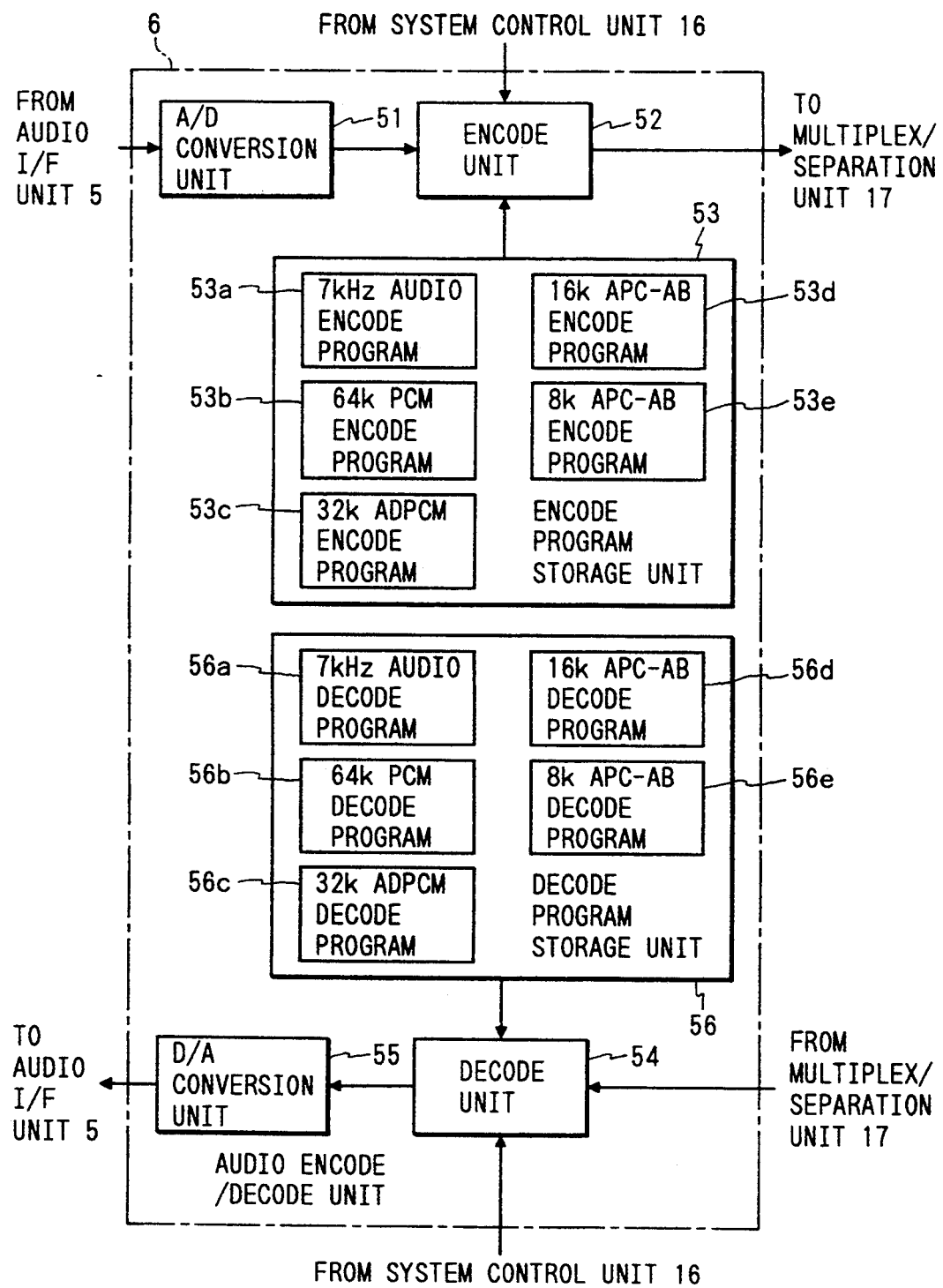

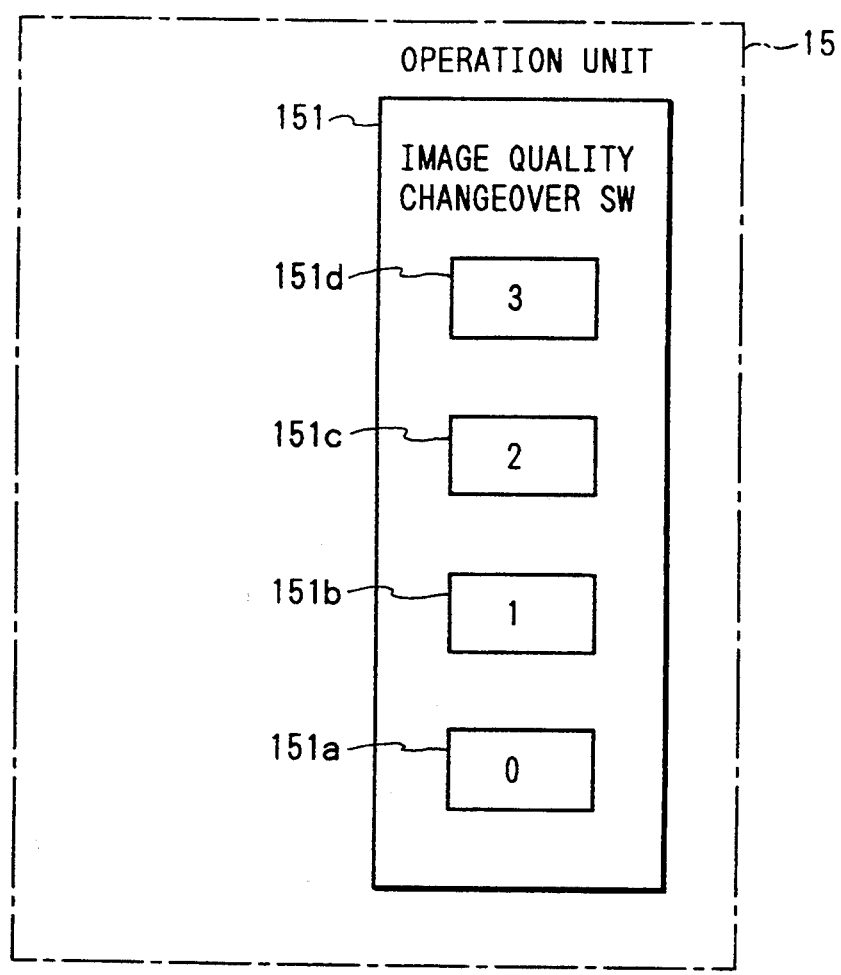

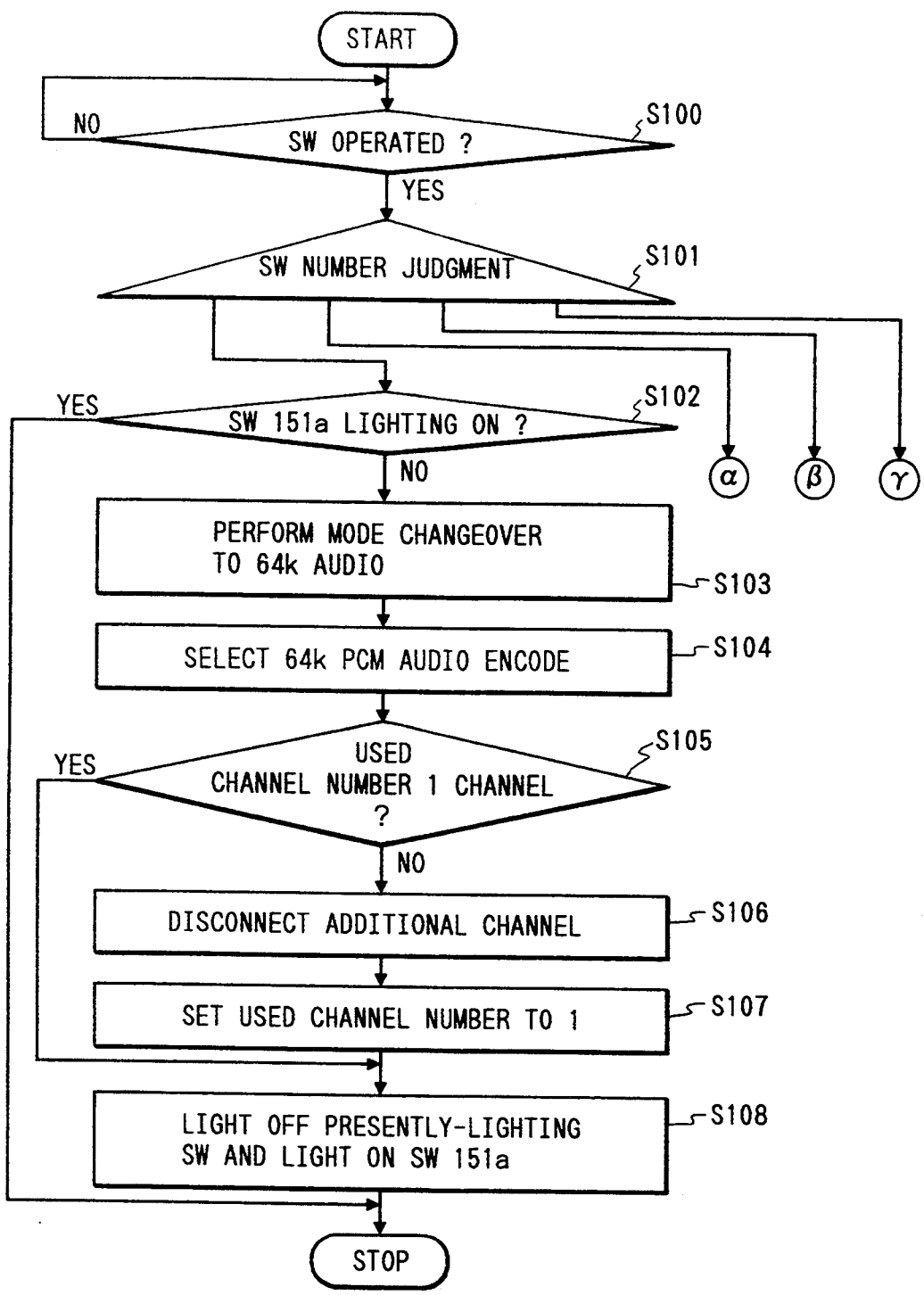

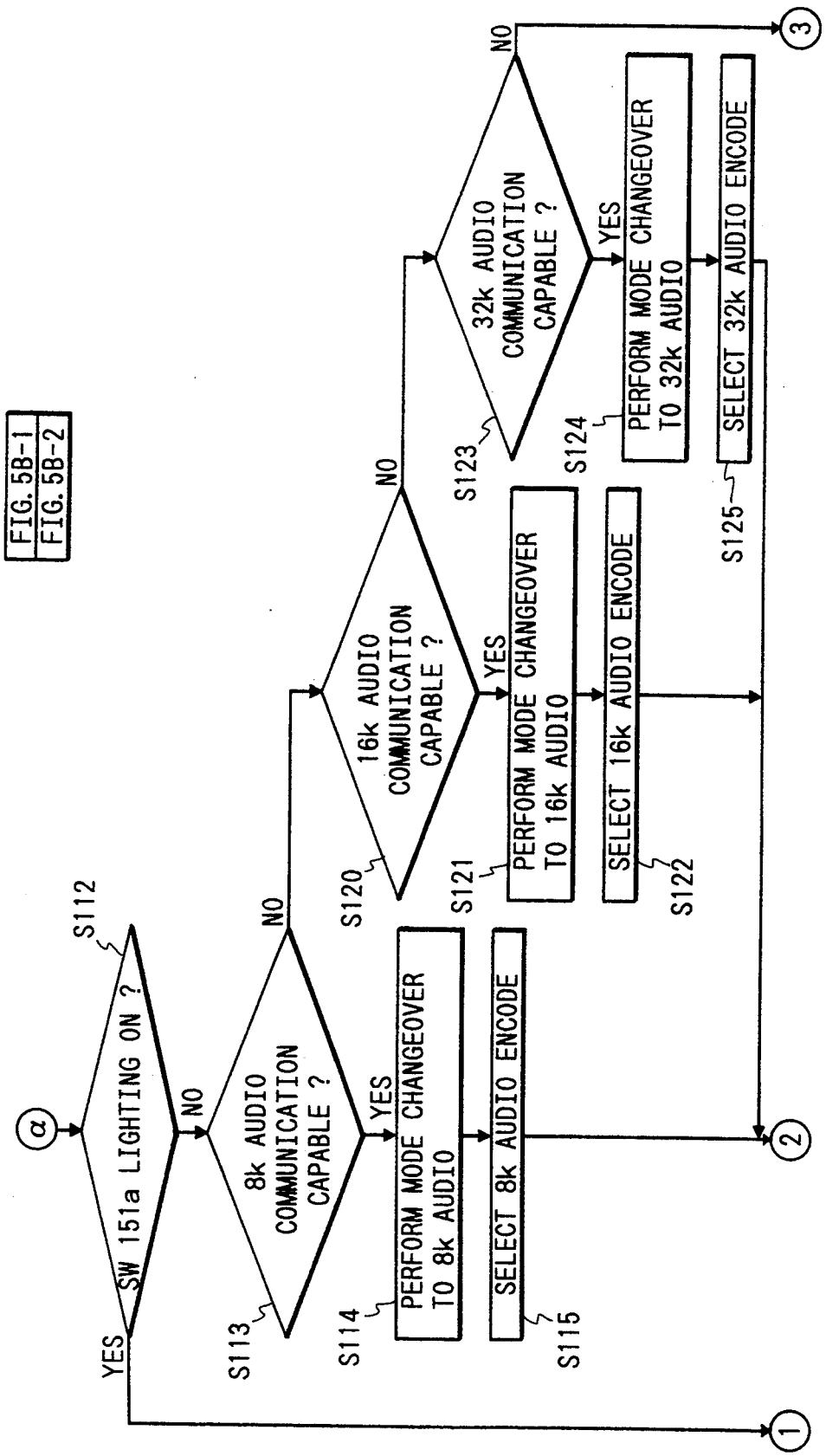

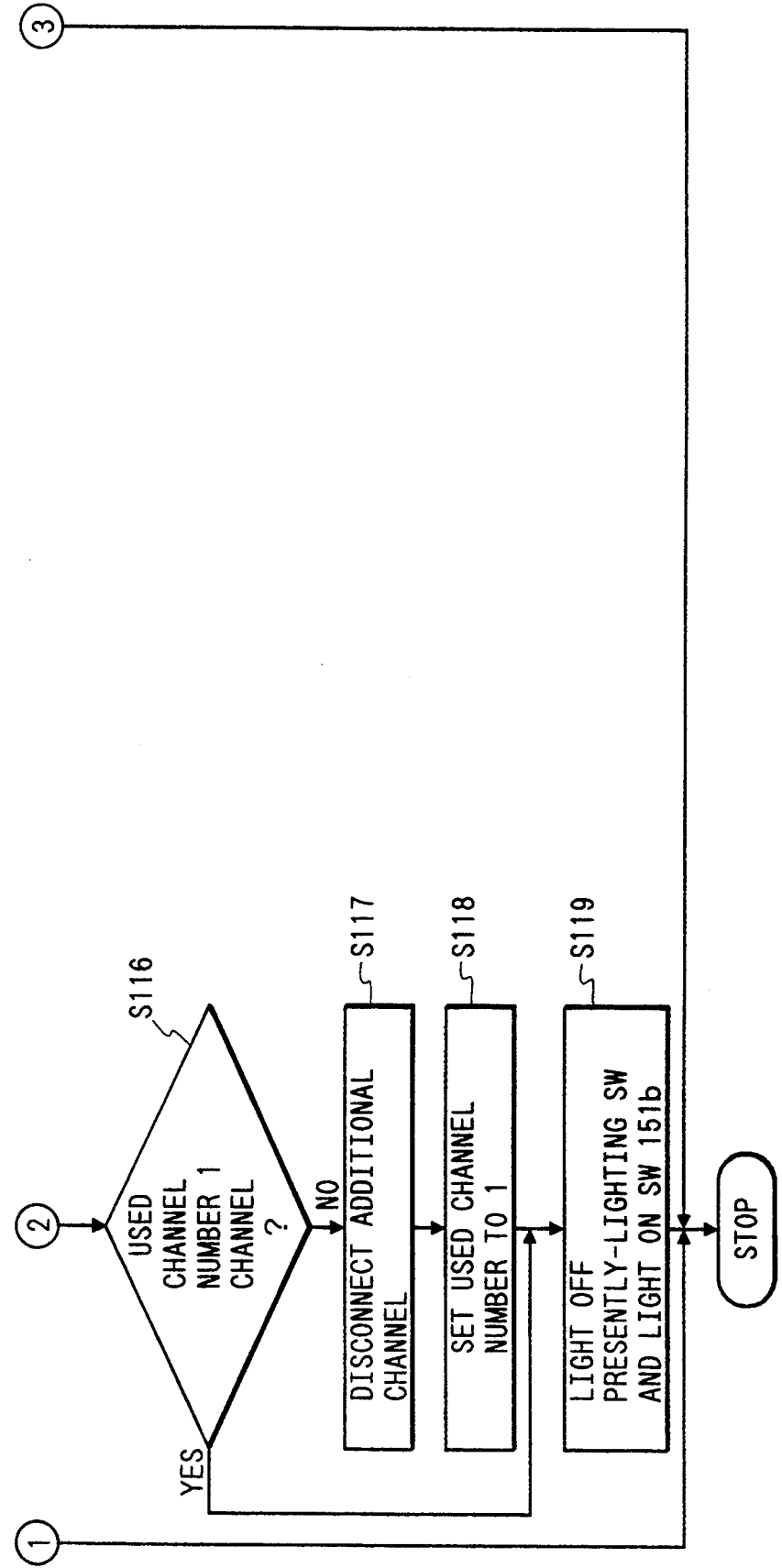

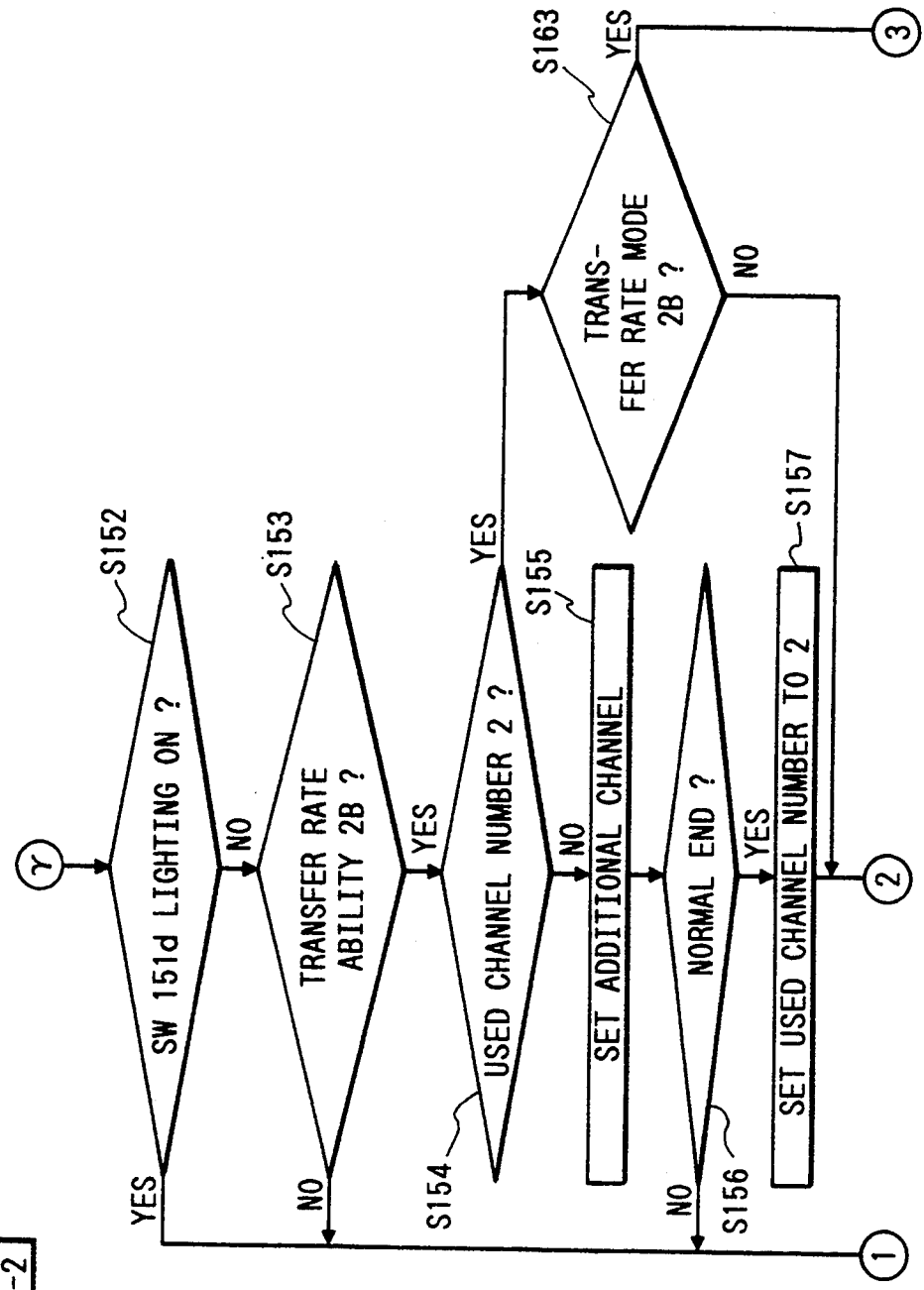

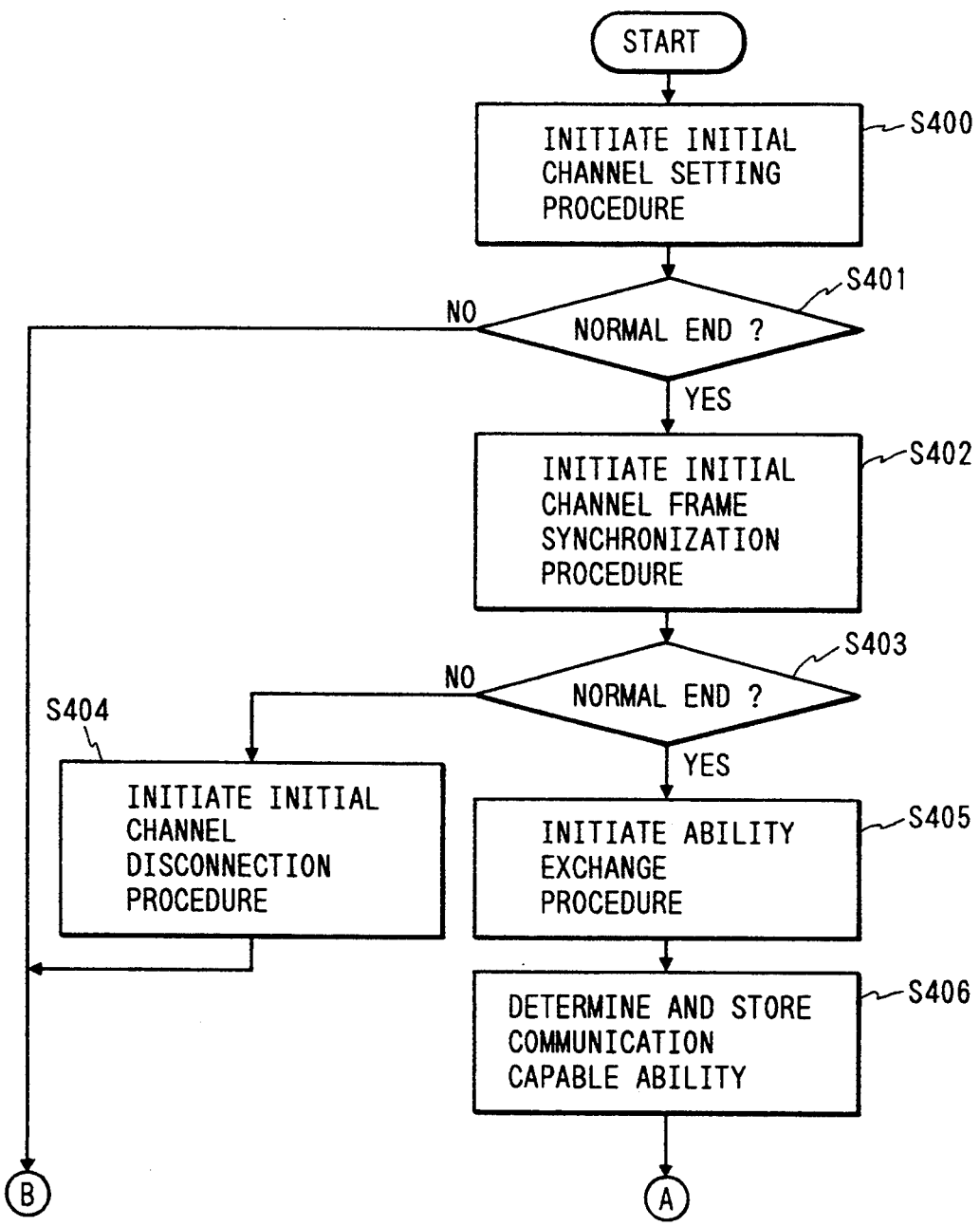

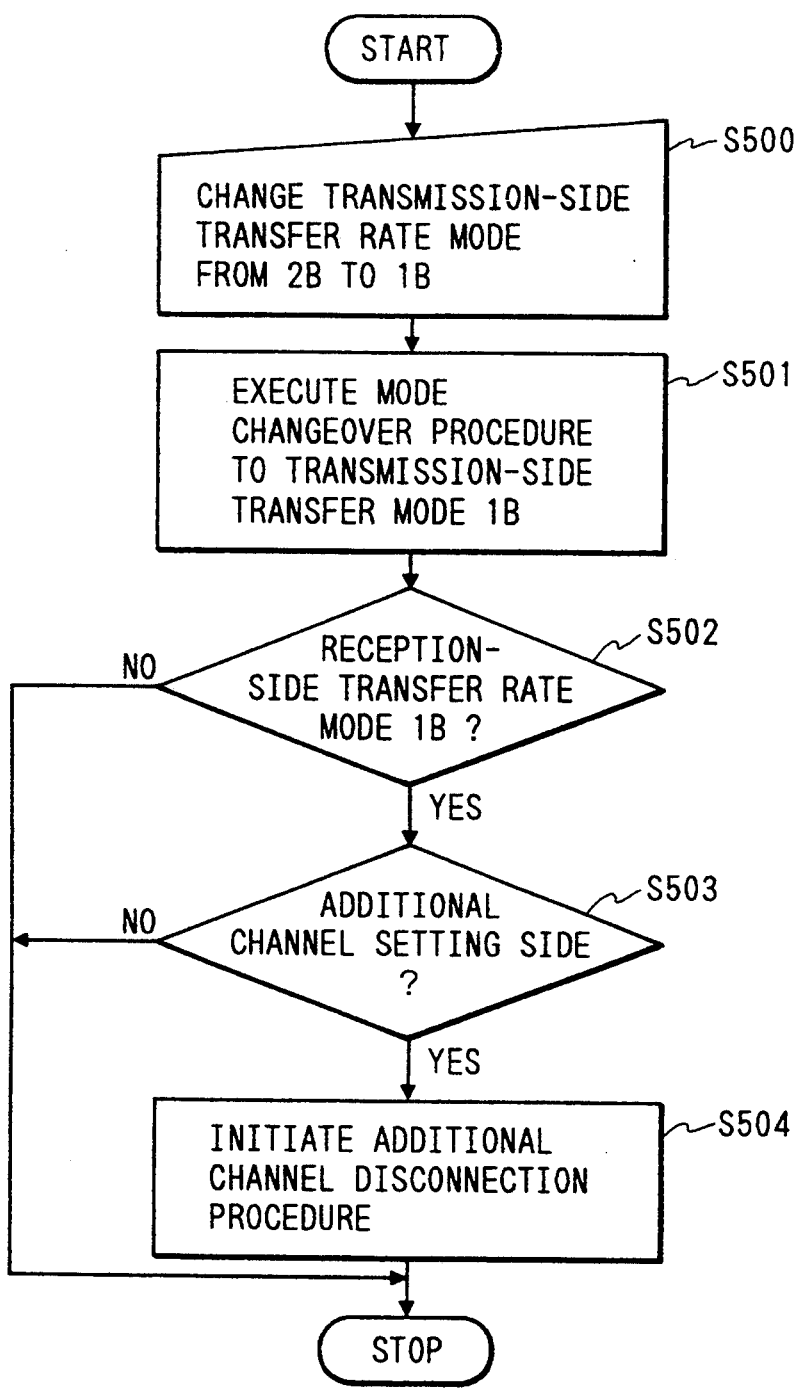

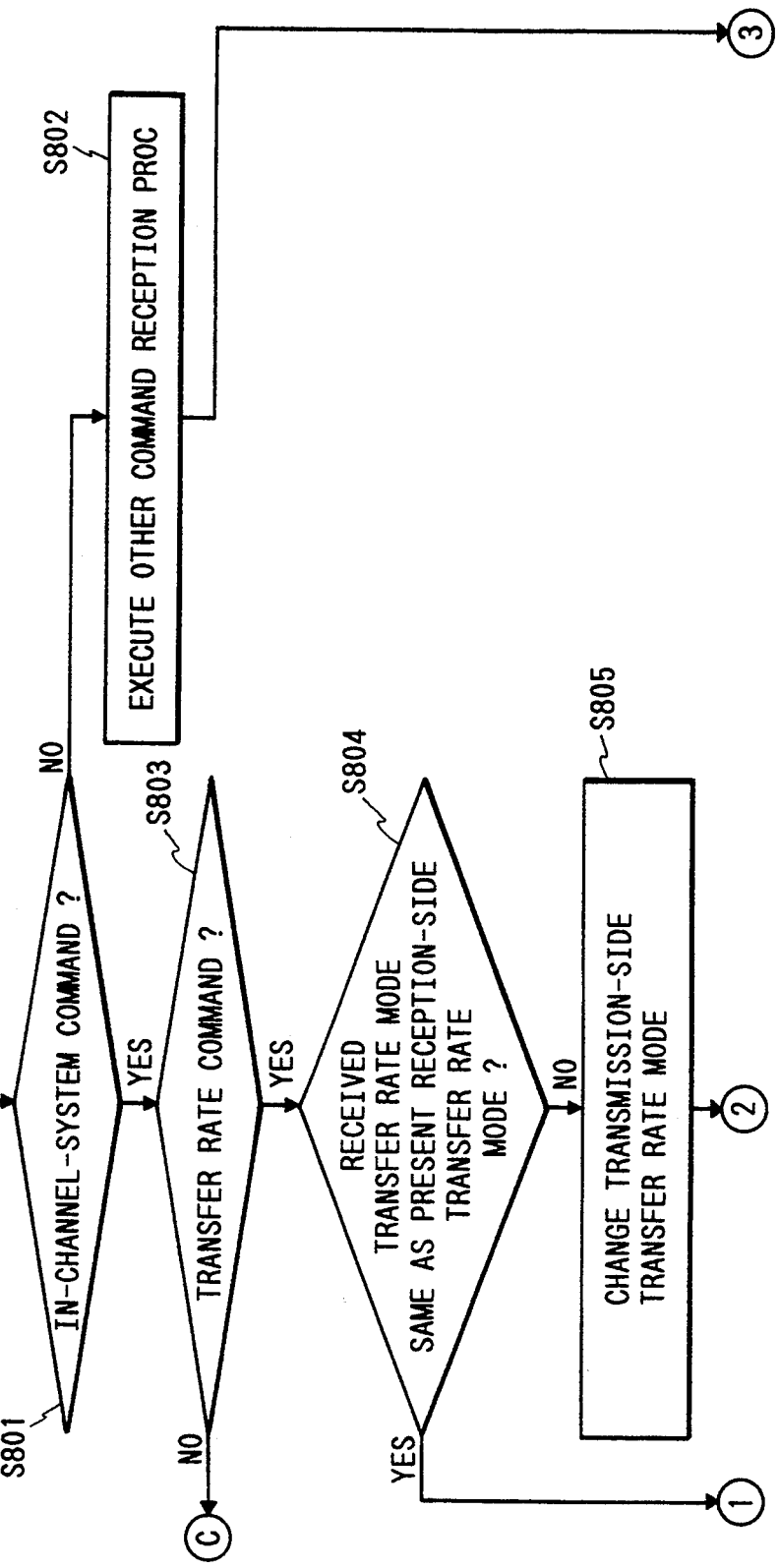

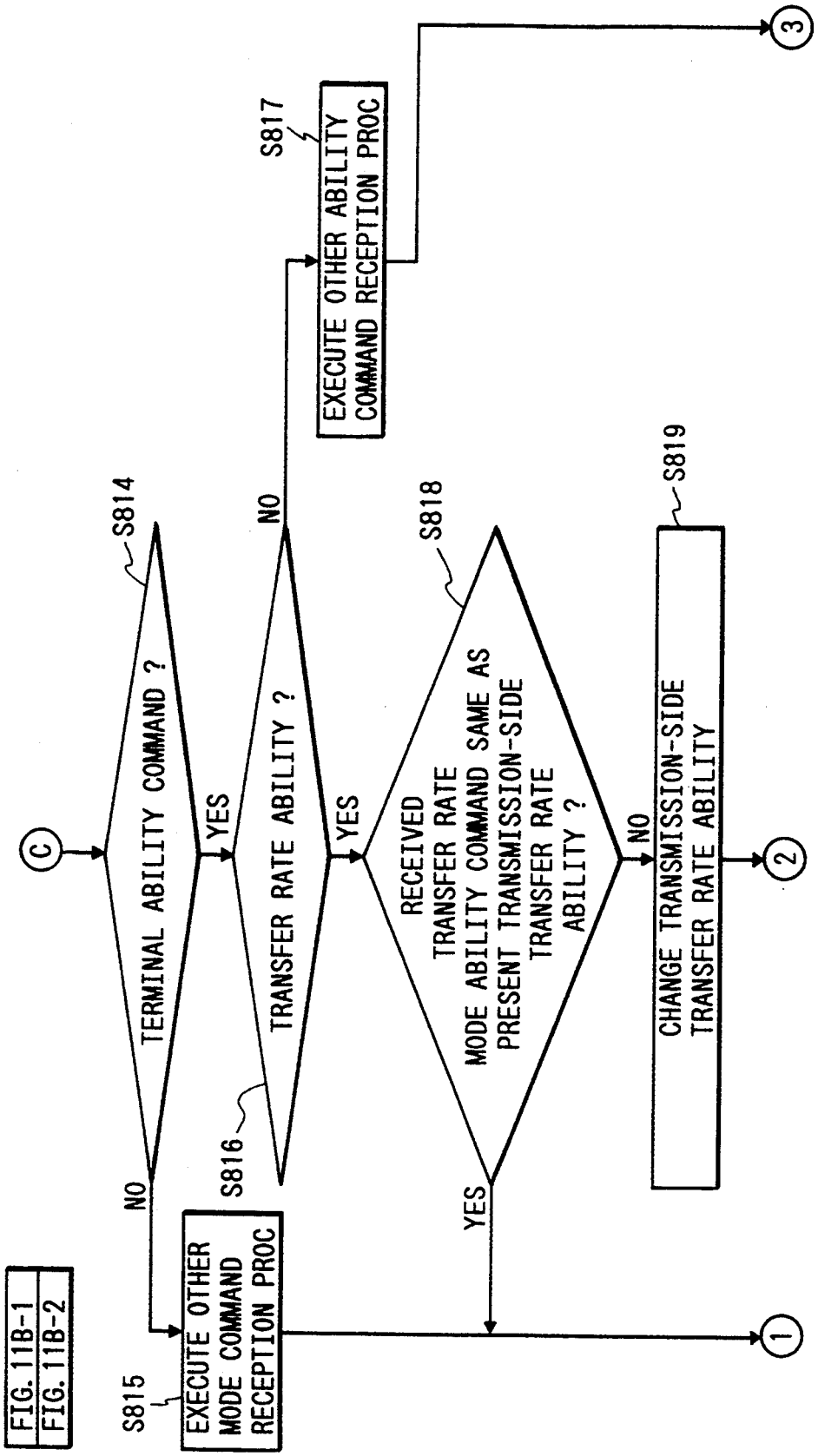

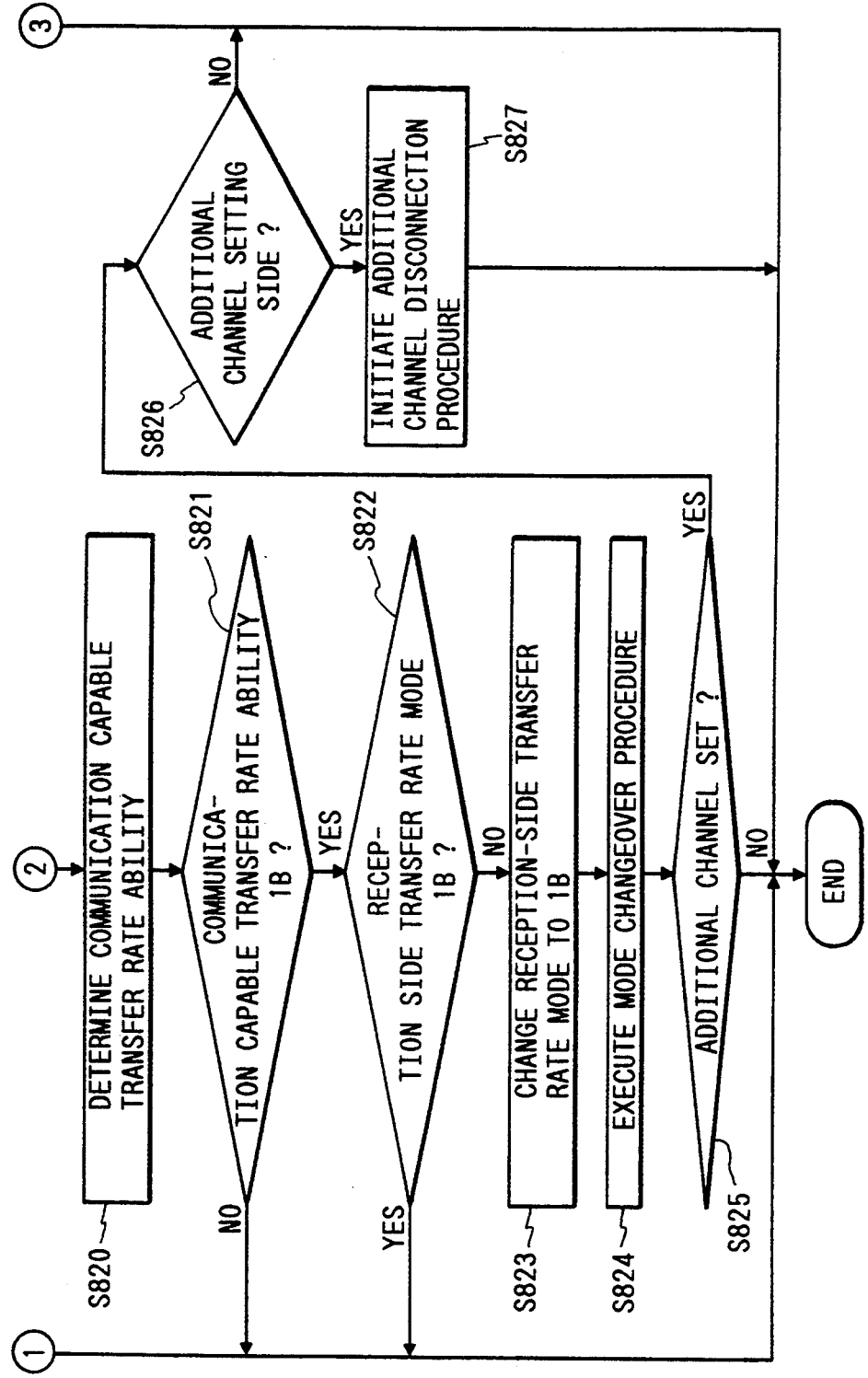

MULTI-MEDIA COMMUNICATION DEVICE

This application is a continuation of application Ser. No. 07/763,504, filed Sep. 20, 1991, now abandoned.

BACKGROUND OF THE INVENTION

1. Field of the Invention

The present invention relates to a multi-media communication device for communicating multiple media such as image (dynamic or still picture image), voice, code and data (thereinafter simply referred to as data), in a combination thereof, via a digital network such as ISDN (Integrated Services Digital Network) between remote sites.

2. Related Background Art

Recently, communication services with the ISDN line have been put to practical use, and the AV (Audio Visual) services such as a television telephone or television conference system using the ISDN line are noted. For the AV services, the international standards have been defined by the CCITT (International Telegraph and Telephone Consultive Comittee), and its draft has been published. For example, the service rules, the protocol rules, and the multi-media multiplexing frame structure rules for AV services have been published as the CCITT recommendations or recommendation drafts H.221, H.242 and H.320. In H.221, the frame structure or exchange of terminal ability for the AV services on the B channel, having a transmission rate of 64 kbps to 1920 kbps, and further the encode allocation of BAS (Bitrate Allocation Signal), useful for the specification of communication mode, are defined. Also in H.242, the protocols for the ability exchange using the BAS between AV terminals and the communication mode changeover are defined, while in H.320, the outline of the overall AV services system is defined.

However, in conventional multi-media communication terminals, the communication path between terminals on initial and additional channels is set (CCITT recommendation I series), and then after the synchronization in the in-channel (B channel) has been established (CCITT recommendation H.221), a predetermined protocol (CCITT recommendation H.242) such as an exchange sequence of terminal ability using the BAS in the in-channel or a mode changeover sequence with the specification of communication mode is executed to perform the multi-media communication of voice, image and data, etc., between terminals.

However, it is out of the range of the rules that each terminal can change its own terminal ability depending on the situation, or what communication mode is to be used within a scope of exchanged ability.

The information transfer rate (communication rate) of each medium in the multi-media communication can be determined by specifying the audio encode method for the audio information, or for the data information, specifying the presence or absence of its use and the transfer rate to be used, in which the information transfer rate on the entire communication path (channel) set up, subtracted by the transfer rates of audio information and data information, becomes a transfer rate for the image information. Accordingly, the information of the transfer rate to be specified in notifying the partner of its own communication mode with the BAS is the audio encode method and the data transfer rate, in which for the image, the transfer rate is automatically set within the system.

However, in the above example, the operator needs the knowledge of the information transfer rate on the communication path and the information transfer rate for each of various types of audio encode methods, in order to know the transfer rate of image information, and further requires the operation for calculating the image transfer rate by taking into consideration the data transfer rate specified.

Also, each terminal can freely change its own terminal ability, depending on the situation, and further when the ability is exchanged in accordance with the CCITT recommendation H.242, which communication mode should be used within a scope of exchanged ability is not defined but can be freely set. For example, when the transfer rate ability is 2B in the exchanged ability, 1B or 2B can be used as the transfer rate mode, and when 2B is used as the transfer rate mode, the communication using a plurality of B channels is enabled. When the communication is performed using a plurality of channels, the additional channels are set on the B channel (in-channel) set by initiating a new call setting procedure, and then a procedure of mode changeover into a transfer rate mode corresponding to the number of additional channels set is executed.

However, in a conventional multi-media communication terminal in which a plurality of B channels as above described are usable, the operator must initiate a call setting or disconnection operating an operation unit such as a keyboard, in performing the call setting or disconnection for the additional channel, in which there was a problem that the operator was forced to perform troublesome operations.

That is, when the transfer rate mode is increased within a scope of transfer rate ability exchanged after the setting of initial channel (first channel), the operator is required to perform the new call setting procedure for setting the additional channels (second and subsequent channels) to change the transfer rate mode, while when the transfer rate mode is decreased, the operator is required to perform a call disconnection procedure for unused additional channels, resulting in a problem that the operator was subject to a burden of performing such a complex call control operation.

SUMMARY OF THE INVENTION

It is an object of the present invention to provide a multi-media communication device which can eliminate the drawbacks associated with the above-described related art and allows the operator to specify the transfer rate of a desired image.

It is another object of the present invention to provide a multi-media communication device which allows the automatic setting of an audio encode method which is optimal for the transfer rate of a specified image.

It is another object of the present invention to provide a multi-media communication device capable of communicating the audio, image and data wherein the quality of image can be arbitrarily selected.

It is another object of the present invention to provide a multi-media communication device wherein when a low image transfer rate is selected, excess channels can be automatically freed if there are any excess channels set.

It is a further object of the present invention to provide a multi-media communication device wherein when a high image transfer rate is selected, the channels can be automatically added and set if the channel is insufficient with preset channels.

It is another object of the present invention to provide a multi-media communication device which enables the multi-media communication easily by using a plurality of B channels even though the operator would not perform any complex call control operation.

It is another object of the present invention to provide a multi-media communication device wherein when the transfer rate ability having a predetermined ability of 2B or more is specified, the additional channels can be automatically set without requiring any operation by the operator.

It is another object of the present invention to provide a multi-media communication device wherein the specification is changed from a first transfer rate mode to a second transfer rate mode smaller than the first transfer rate mode during the communication, the unused additional channels can be automatically disconnected without requiring any operation by the operator.

It is another object of the present invention to provide a multi-media communication device wherein the specification is changed from a first transfer rate mode to a second transfer rate mode larger than the first transfer rate mode during the communication, the additional channels can be automatically added and set without requiring any operation by the operator.

It is another object of the present invention to provide a multi-media communication device wherein when the specification is changed from a first transfer rate ability to a second transfer rate ability smaller than the first transfer rate ability during the communication, the transfer rate mode can be automatically changed to a transfer rate mode corresponding to the second transfer rate ability without requiring any operation by the operator, and the unused additional channels can be automatically disconnected without requiring any operation by the operator.

The above and other objects of the present invention will be apparent from the following drawings and the detailed description based on the drawings.

BRIEF DESCRIPTION OF THE DRAWINGS

FIG. 2 is a block diagram showing the configuration of an audio encode/decode unit;

FIG. 3 is a constitution view showing an image quality changeover switch provided on an operation unit;

FIGS. 5A to 5D are flowcharts for explaining the operation of the device in the first example;

FIGS. 7A and 7B are flowcharts showing a control procedure in the second example;

FIG. 8 is a flowchart showing a control procedure in the third example;

FIGS. 11A and 11B are flowcharts showing one example of a control procedure on the reception side.

DETAILED DESCRIPTION OF THE PREFERRED EMBODIMENTS (First example)

Figure 1:
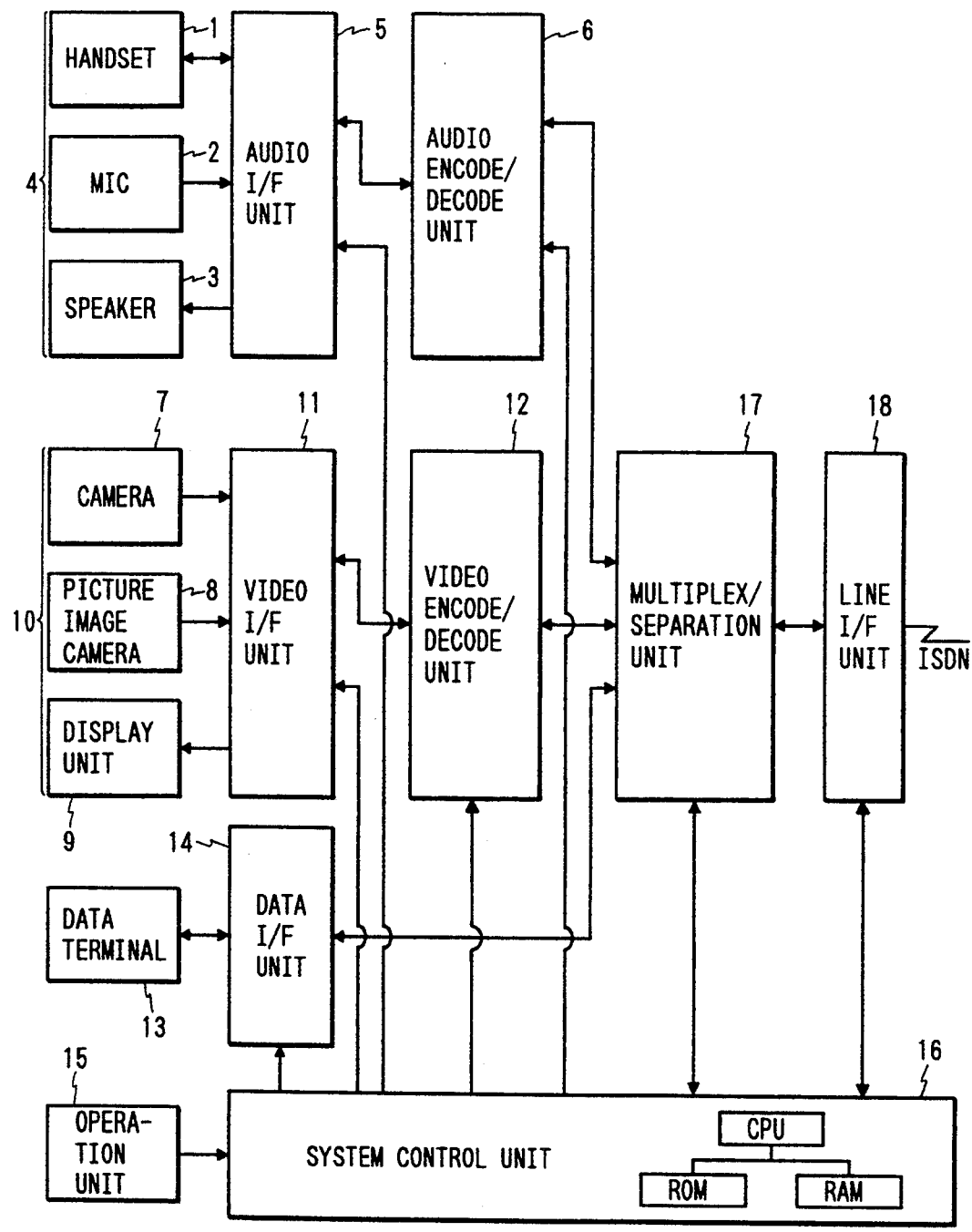
FIG. 1 is a block diagram showing one example of a multi-media communication terminal according to the present invention.

FIG. 1 is a block diagram showing one example of a multi-media communication terminal according to the present invention.

In the same figure, 1 is a handset (transmitter and receiver) for inputting and outputting the voice, 2 is a microphone for inputting the voice, and 3 is a speaker for outputting the voice. And in this example, audio input/output means 4 is constituted of the handset 1, the microphone 2 and the speaker 3.

Reference numeral 5 is an audio interface unit for performing an operation for switching between the handset 1, the microphone 2 and the speaker 3' which are the audio input/output means 4, an ON/OFF hook detecting operation for detecting whether the handset 1 is placed in an ON or OFF hook state, an echo cancel operation for canceling the echo generated when the microphone 2 and the speaker 3 are used, and an operation for creating the tone such as a dial tone, ring tone, busy tone or terminating tone. Reference numeral 6 is an audio encode/decode unit for encoding the transmitted audio signal and decoding the received audio signal in accordance with 64 kbps PCM A-law, 64 kbps PCM $\mu$-law, 64 kbps/56 kbps/48 kbps SB-ADPCM, 32 kbps ADPCM, 16 kbps (e.g., APC-AB), or 8 kbps audio signal encode and decode law. The selection of encode and decode method can be determined by an instruction of a system control unit 16.

Reference numeral 7 is a camera for inputting a self-portrait and so on, 8 is a picture image camera for inputting a picture, a drawing and so on. Reference numeral 9 is a display unit having a display screen for displaying an input image from the camera 7 or the picture image camera 8 or a received image from a partner's communication terminal. In this example, image input/output means 10 is constituted of the camera 7, the picture image camera 8 and the display unit 9.

Reference numeral 11 is a video interface unit for performing an operation for switching between the camera 7 and the picture image camera 8, a display switching operation for switching between input image and output image on the display screen, and an image signal synthesizing operation for displaying the input image and the output image in divisions on the display screen. Reference numeral 12 is a video encode/decode unit for encoding the transmitted image signal and decoding the received image signal in accordance with the CCITT recommendation draft H.261.

Reference numeral 13 is a data terminal for use in the data communication, and 14 is a data interface unit.

Reference numeral 15 is an operation unit consisting of a keyboard, a touch panel, etc. for inputting various types of control information. Reference numeral 16 is a system control unit having CPU, ROM, RAM and auxiliary storage, etc., for controlling the whole device by supervising the state of various units such as the audio interface unit 5 or the video interface unit 11, and creating a desired display screen or executing an application program in accordance with the state. Reference numeral 17 is a multiplex/separation unit for multiplexing the audio transmit signal from the audio encode/decode unit 6, the image transmit signal from the video encode/decode unit 12, the data from the data interface unit 14, as the information signal, and further the control command from the system control unit 16 as the BAS, for each unit of transmission frame, in accordance with the CCITT recommendation H.221, and notifying each unit (audio encode/decode unit 6, video encode/decode unit 12 and data interface unit 14) of the reception frame separated for each media of configuration unit and the BAS.

Reference numeral 18 is a line interface unit for controlling the line based on a command transmitted and received to and from the system control unit 16 through a user and network interface of ISDN (CCITT recommendation I series).

In the multi-media communication terminal as constituted above, after the communication path to a partner's terminal has been set by operating the operation unit 15, voice, image and transmission data are input.

However, if the voice is input through the handset 1 or the microphone 2, the audio interface unit 5 performs a predetermined processing with an instruction from the system control unit 16, in which a transmit audio signal is input into the audio encode/decode unit 6. In the audio encode/decode unit 6, the transmit audio signal is encoded with an instruction from the system control unit 16 in accordance with a predetermined encoding law, and then the transmit audio signal is transmitted to the multiplex/separation unit 17. Then, in the multiplex/separation unit 17, the transmit audio signal is multiplexed with other signals for each unit of transmission frame, and the audio signal is transmitted to the partner's communication terminal via a predetermined line control (CCITT recommendation I series) in the line interface unit 18.

Also, if an image is input from the camera 7 or the picture image camera 8, the video interface unit 11 performs a predetermined processing with an instruction from the system control unit 16, in which a transmit image signal is input into the video encode/decode unit 12. In the video encode/decode unit 12, the transmit image signal is encoded with an instruction from the system control unit 16 in accordance with a predetermined encoding law (CCITT recommendation draft H.261), in which the transmit image signal is transmitted to the multiplex/separation unit 17. Then, in the multiplex/separation unit 17, the transmit image signal is multiplexed with other signals for each unit of transmission frame, and the image signal is transmitted to the partner's communication terminal via a predetermined line control (CCITT recommendation I series) in the line interface unit 18. Note that in the transmission of the image signal, the input information can be monitored by displaying the input image on the display unit 9.

Also, if the transmit data is input to the data terminal 13, the data interface unit 14 performs a predetermined processing with an instruction from the system control unit 16, and then the transmit data is multiplexed with other signals for each unit of transmission frame in the multiplex/separation unit 17, and is transmitted to the partner's communication terminal via a predetermined line control (CCITT recommendation I series) in the line interface unit 18.

Note that the transmission of audio, image and transmit data as above described is effected to the partner's communication terminal with desired transfer rate ability and transfer rate mode by appropriately transmitting and receiving the command between the multiplex/separation unit 17 and the system control unit 16.

On the other hand, if the signal information is received from the partner's communication terminal, its signal information is transmitted via a predetermined line control (CCITT recommendation I series) in the line interface unit 18 to the multiplex/separation unit 17.

The multiplex/separation unit 17 separates the received frame for each media of configuration unit and the BAS to transmit its signal information to each unit.

That is, when the received signal information is a receive audio signal, it is decoded in the audio encode/decode unit 6 with an instruction from the system control unit 16, and then is output to the handset 1 or speaker 3 via a predetermined processing in the audio interface unit 5.

Also, when the received signal information is a receive image signal, it is decoded in the video encode/decode unit 12 with an instruction from the system control unit 16, and then the received image is displayed on the display unit 9 via a predetermined processing in the video interface unit 11.

Further, when the received signal information is a receive data, it is transmitted from the data interface unit 14 to the data terminal 13, and the received data is output to the data terminal 13.

Figure 5C:
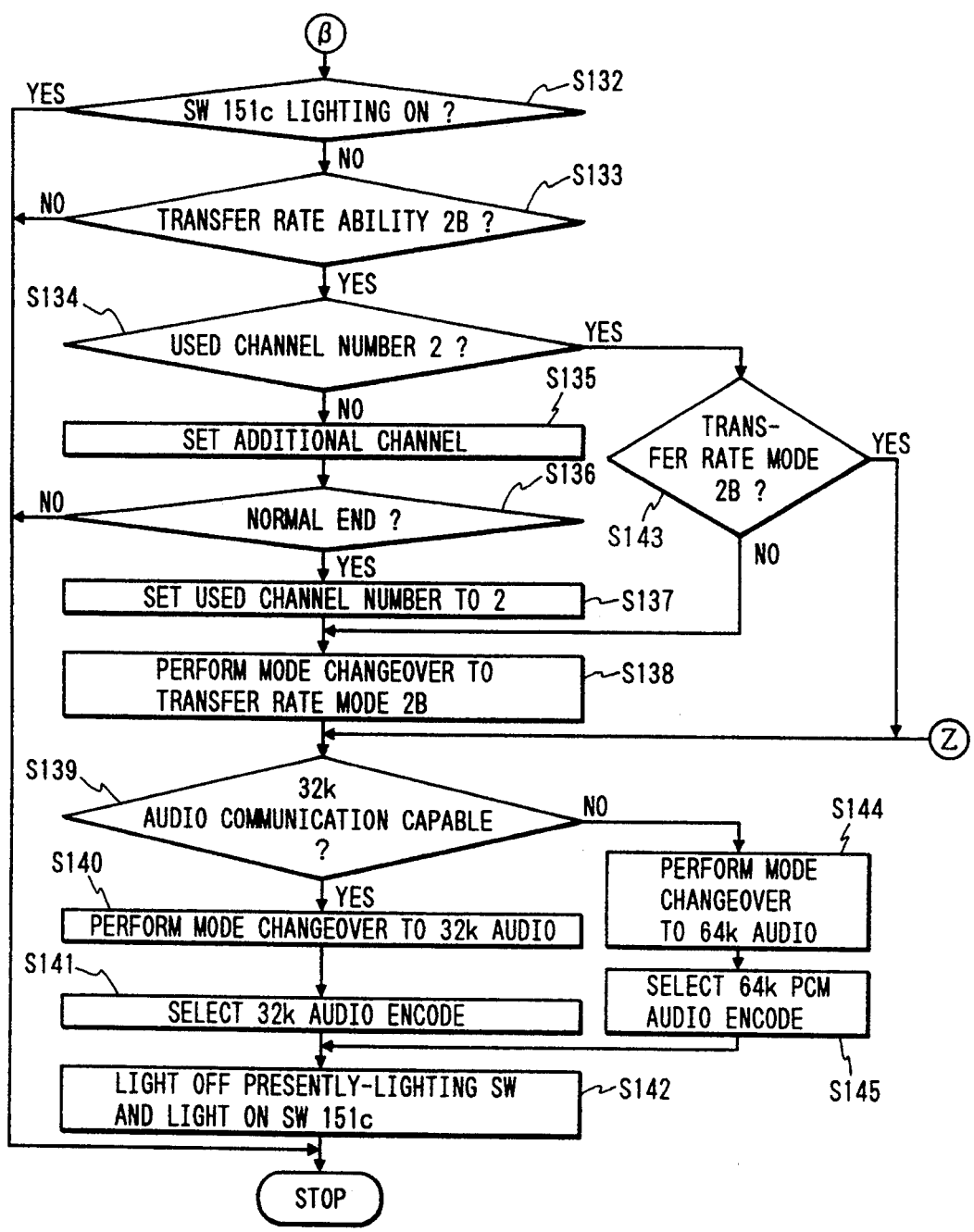
Figures 2, 5D:
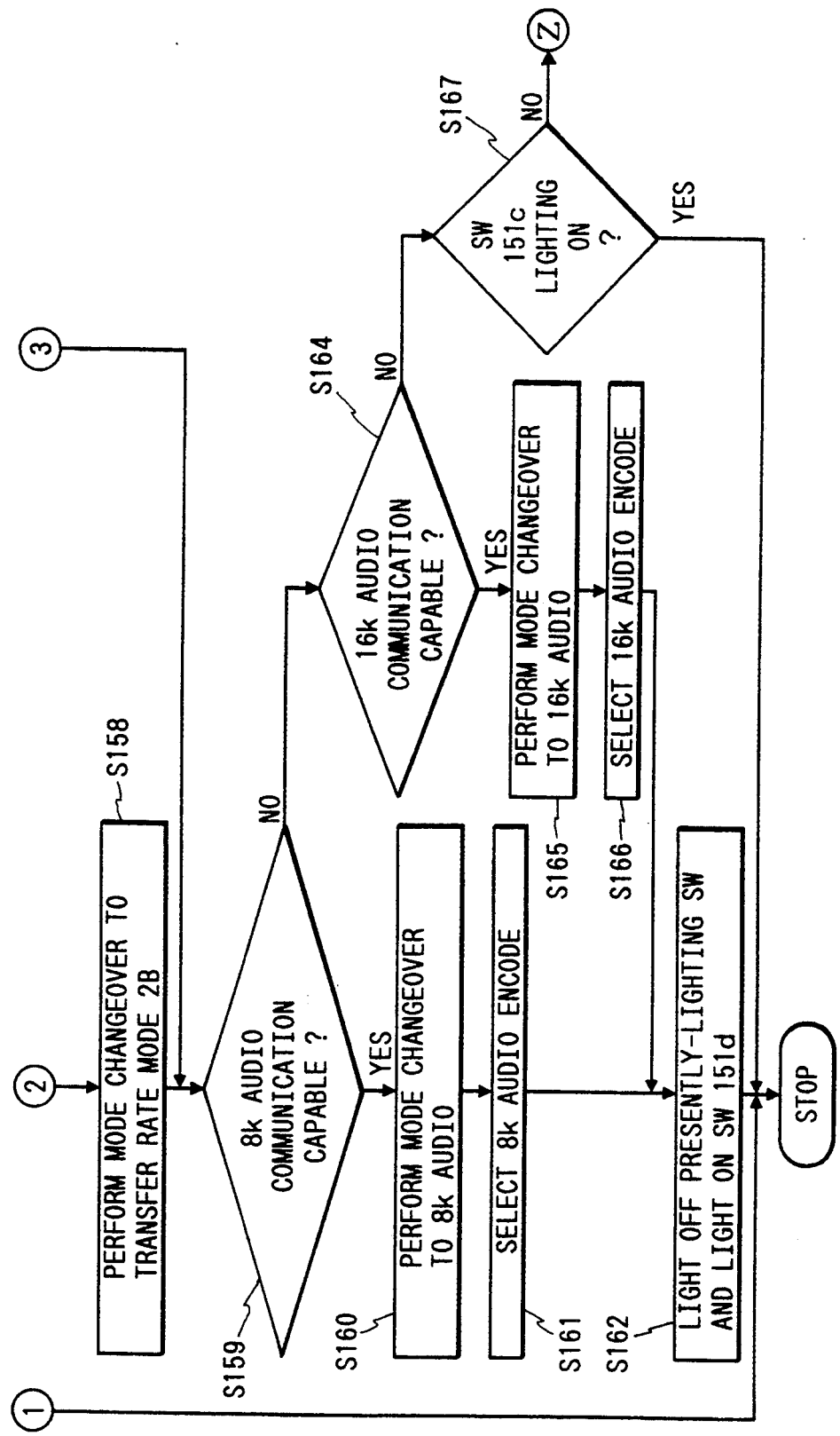

FIG. 2 is a block diagram of the audio encode/decode unit 6. As shown in the same figure, the audio encode/decode unit 6 is constituted of an A/D conversion unit for A/D converting the audio input from the audio interface unit 5 in accordance with an instruction of the system control unit 16, an encode unit for encoding the A/D converted audio data with an encode program instructed by the system control unit 16, an encode program storage unit 53 for storing a program describing an encode algorithm, a decode unit 54 for decoding the encoded audio data received from the multiplex/separation unit 17 with a decode program instructed by the system control unit 16, a D/A conversion unit 55 for D/A converting the decoded audio data, and a decode program storage unit 56 for storing a program describing a decode algorithm. In the encode program storage unit 53 is stored a 7 kHz audio (64 kbps/56 kbps/48 kbps SB-ADPCM) encode program 53a, a 64 kbps PCM (A-law/μ-law) encode program 53b, a 32 kbps SB-ADPCM encode program 53c, a 16 kbps APC-AB encode program 53d, and a 8 kbps APC-AB encode program 53e. In the decode program storage unit 56 is stored a 7 kHz audio (64 kbps/56 kbps/48 kbps SB-ADPCM) decode program 56a, a 64 kbps PCM (A-law/μ-law) decode program 56b, a 32 kbps SB-ADPCM decode program 56c, a 16 kbps APC-AB decode program 56d and a 8 kbps APC-AB decode program 56e.

Accordingly, in this example, the audio encode can be set with four transfer rates of 64 kbps, 32 kbps, 16 kbps and 8 kbps, and when the line interface unit 18 is connected to an ISDN basic interface, up to 2 channels (128 kbps) can be set so that the transfer rate of image without transfer of data can be specified in eight kinds of transfer rates, including a case of no image.

FIG. 3 is a view illustrating the constitution of a lamp switch provided on a part of the operation unit 15 for allowing the user to specify the transfer rate of an image, and displaying a current transfer rate of an image with the lighting of a lamp, in which the selection and a display of the transfer rate of the image is indicated with an image quality changeover switch 151 to the operator. Reference numeral 151a–d are individual lamp switches constituting the image quality changeover switch 151, in which a lamp switch 151a indicates no image with the lighting, meaning that the transfer of the image is disenabled if it is selected by the operator. A lamp switch 151b indicates that the transfer of the image is performed at a low transfer rate with its lighting, meaning that the transfer of the image at the low rate is enabled if it is selected by the operator. A lamp switch 151c indicates that the transfer of the image is performed at an intermediate transfer rate with its lighting. A lamp switch 151d indicates that the transfer of the image is performed at a high transfer rate with its lighting, meaning that the transfer of the image at the high rate is enabled if it is selected by the operator.

The table immediately below shows the number of channels to be selected, the audio transfer rate and the image transfer rate when each image quality changeover switch 151a-d is selected, and is stored in the system control unit 16. The same table shows the number of channels, the information transfer rate, the audio transfer rate and the image transfer rate, at the image quality level 1 if the image quality changeover switch 151b is selected, the image quality level 0 if the image quality changeover switch 151a is selected, the image quality level 3 if the image quality changeover switch 151d is selected, and the image quality level 2 if the image quality changeover switch 151c is selected, respectively.

TABLE

| Number of channels | Information transfer rate | Audio transfer rate | Image transfer rate | Image quality level |
| --- | --- | --- | --- | --- |
| 1 | 62.4 kbps | 8 kbps | 44.4 kbps | 1 |
|  |  | 16 kbps | 36.4 kbps |  |
|  |  | 32 kbps | 30.4 kbps |  |
|  |  | 64 kbps | None | 0 |
| 2 | 124.8 kbps | 8 kbps | 116.8 kbps | 3 |
|  |  | 16 kbps | 108.8 kbps |  |
|  |  | 32 kbps | 92.8 kbps | 2 |
|  |  | 64 kbps | 60.8 kbps |  |

Figure 4:
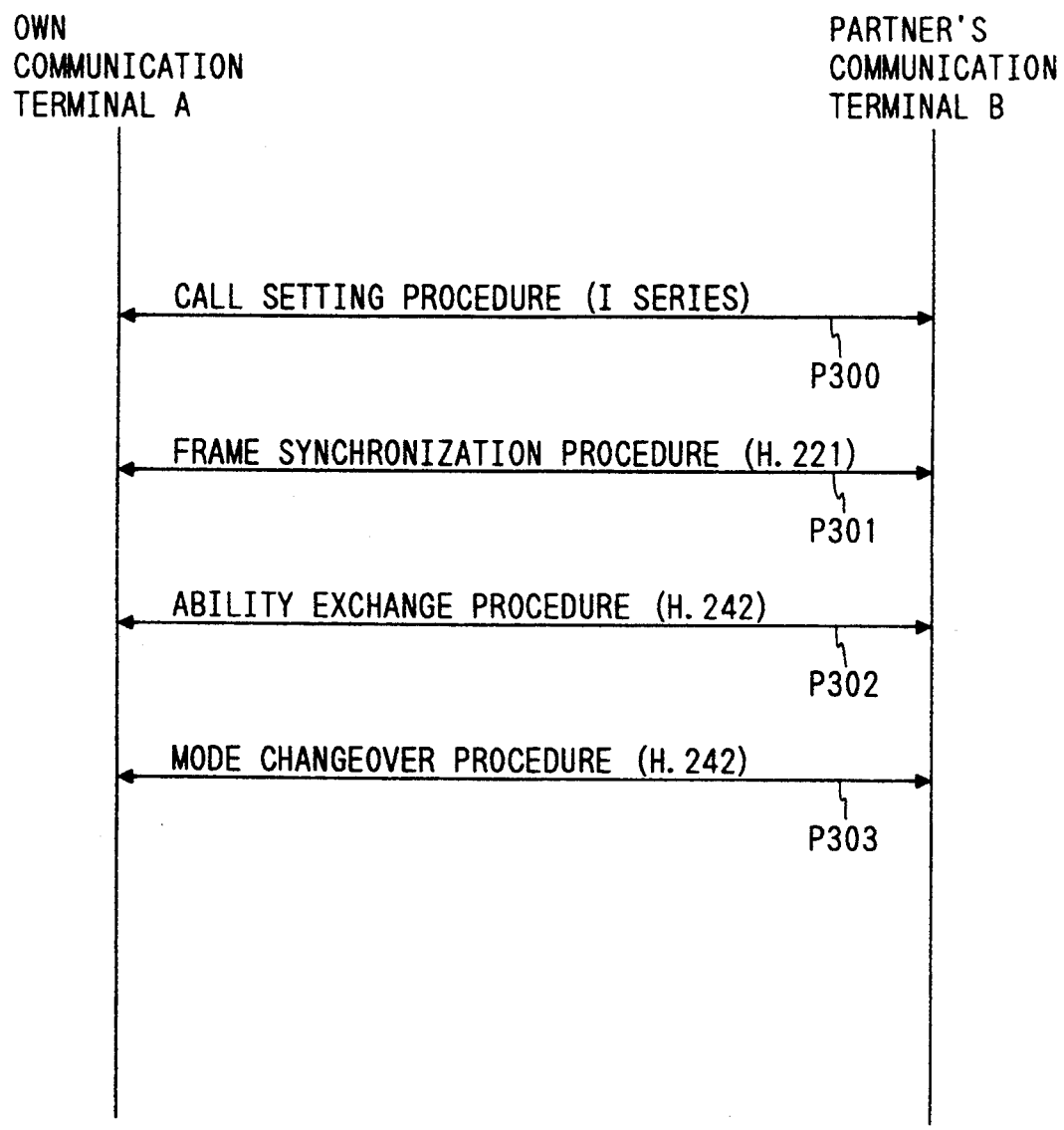
FIG. 4 is a procedure sequence diagram showing a procedure for starting the AV communication.

FIG. 4 is a sequence diagram showing an operation procedure to be performed at the start of communication, when the communication is performed between its own communication terminal A and a partner's communication terminal B.

First, to begin the communication, the call setting procedure is performed on a D channel through a user and network interface of ISDN (CCITT recommendation I series) (procedure P300).

Next, the frame synchronization procedure is performed on a B channel that has been set in accordance with the CCITT recommendation H.221 (procedure P301).

If the frame synchronization has been established, the ability exchange procedure is performed with BAS in accordance with the CCITT recommendation H.242 (procedure P302). In the ability exchange procedure P302, the own communication terminal A transmits its transfer rate ability and the terminal ability for audio and data, which have been preset to the partner's communication terminal B, and receives the partner's terminal ability such as a transfer rate ability from the partner's communication terminal B. The scope of ability compatible between the own terminal ability and the partner's terminal ability is stored in a RAM of the system control unit 16, together with the partner's terminal ability, as the communication capable ability at its communication.

Next, after the above-mentioned ability exchange procedure P302 is executed, the mode changeover procedure is performed with BAS in accordance with the CCITT recommendation H.242, in order to specify the communication mode at which the communication is actually performed within a scope of the communication capable ability (procedure P303). In the mode changeover procedure P303, the communication mode, such as a transfer rate mode, audio encode and data rate for the own communication terminal A that has been preset, is adjusted within a scope of the communication capable ability, and transmitted as its own communication mode to the partner's communication terminal B. At this time, the partner's communication terminal B also transmits its own communication mode. The received communication mode of partner's communication terminal B is stored in the RAM of the system control unit 16 as the partner's communication mode.

By determining the communication modes of its own communication terminal A and the partner's communication terminal B, the communication between the communication terminal A and the partner's communication terminal B is enabled. Thereafter, if the terminal ability or the communication mode is changed, the ability exchange procedure P302 or the mode changeover procedure P303 is executed again. Further, when the additional channel is added, the call setting procedure P330 for setting the additional channel is executed, the frame synchronization procedure P301 on the set additional channel is executed, and the ability exchange procedure P302 or the mode changeover procedure P303 is executed if required.

However, if the mode changeover procedure is not performed, the communication mode is only effective at the 64 kbps PCM audio.

FIGS. 5A to 5D are flowcharts showing the operation of the device in the first example. The operation will be described below following the flowchart.

At step S100 of FIG. 5A, it is examined whether or not the image quality changeover switch 151 is operated. If operated, the procedure proceeds to step S101. At step S101, it is determined to which switch the operation is performed, in which the procedure proceeds to step S102 for the switch 151a, step S112 of FIG. 5B for the switch 151b, step S132 of FIG. 5C for the switch 151c, or step S152 of FIG. 5D for the switch 151d. At step S102, it is examined whether or not the switch 151a is lighting on at present, and if it is lighting on, the processing is terminated. If it is not lighting on, the procedure proceeds to step S103. At step S103, the BAS code of 64 kbps PCM audio is notified to the multiplex/separation unit 17 to initiate the mode changeover procedure. Next, at step S104, the selection of 64 kbps PCM encode is notified to the audio encode/decode unit 6, and the subsequent audio encode is made with 64 kbps PCM. At step S105, the number of channels to be used at present is investigated, in which the procedure proceeds to step S108 if the used channel number is 1, or to step S106 if it is not 1. At step S106, the disconnection of additional channel being used is notified to the line interface unit 18 to initiate the call disconnection procedure. At step S107, the used channel number is set to 1. Finally, at step S108, the switch that is lighting on at present is turned off, and the switch 151a is turned on to terminate the processing.

At step S112 of FIG. 5B, it is examined whether or not the switch is lighting on at present, and if it is lighting on, the processing is terminated. If it is not lighting on, the procedure proceeds to step S113. At step S113, it is examined whether or not the 8 kbps audio communication is capable with the ability exchanged in the ability exchange procedure, and if it is not capable, the procedure proceeds to step S120. If it is capable, the procedure proceeds to step S114. At step S114, the BAS code of 8 kbps audio is notified to the multiplex/separation unit 17 to initiate the mode changeover procedure. Next, at step S115, the selection of 8 kbps APCAB encode is notified to the audio encode/decode unit 6, whereby the subsequent audio encode is performed with the 8 kbps APCAB. At step S116, the number of channels being used at present is investigated, and if the used channel number is 1, the procedure proceeds to step S119, and if it is not 1, the procedure proceeds to step S117. At step S117, the disconnection of used additional channel is notified to the line interface unit 18, and the call disconnection procedure is initiated. At step S118, the used channel number is set to 1. Finally, at step S119, the switch that is lighting on at present is turned off, and the switch 151b is turned on to terminate the processing. At step S120, it is examined whether or not the 16 kbps audio communication is capable with the ability exchanged in the ability exchange procedure, and if it is not capable, the procedure proceeds to step S123. If it is capable, the procedure proceeds to step S121. At step S121, the BAS code of 16 kbps audio is notified to the multiplex/separation unit 17 to initiate the mode changeover procedure. Next, at step S122, the selection of 16 kbps APCAB encode is notified to the audio encode/decode unit 6 to perform the subsequent audio encode with the 16 kbps APCAB, and then the procedure proceeds to step S116. At step S123, it is examined whether or not the 32 kbps audio communication is capable with the ability exchanged in the ability exchange procedure, and if it is not capable, the procedure is terminated. If it is capable, the procedure proceeds to step S124. At step S124, the BAS code of 32 kbps audio is notified to the multiplex/separation unit 17 to initiate the mode changeover procedure. Next, at step S125, the selection of 32 kbps APCAB encode is notified to the audio encode/decode unit 6 to perform the subsequent audio encode with the 32 kbps APCAB, and then the procedure proceeds to step S116.

At step S132, it is examined whether or not the switch 151c is lighting on at present, and if it is lighting on, the processing is terminated. If it is not lighting on, the processing proceeds to step S133. At step S133, it is examined whether or not the transfer rate ability is 2B with the ability exchanged in the ability exchange procedure. If it is 2B, the procedure proceeds to step S134, while if it is not 2B, the processing is terminated. At step S134, the number of channels being used at present is investigated, and if the used channel number is 2, the procedure proceeds to step S143, and if it is not 2, the procedure proceeds to step S135. At step S135, the setting of new additional channel is notified to the line interface unit 18 to initiate the call setting procedure. At step S136, it is examined whether or not the call setting is completed normally, based on a notification from the line interface unit 18, and if it has been completed normally, the procedure proceeds to step S137, or if the call setting has failed, the processing is terminated. At step S137, the used channel number is set to 2. At step S138, the BAS code of transfer rate mode 2B is notified to the multiplex/separation unit 17 to initiate the mode changeover procedure. At step S139, it is examined whether or not the 32 kbps audio communication is capable with the ability exchanged in the ability exchange procedure. If it is capable, the procedure proceeds to step S144, or if it is capable, the procedure proceeds to step S144, or if it is capable, the procedure proceeds to step S140. At step S140, the BAS code of 32 kbps audio is notified to the multiplex/separation unit 17 to initiate the mode changeover procedure. Next, at step S141, the selection of 32 kbps ADPCM encode is notified to the audio encode/decode unit 6 to perform the subsequent audio encode with the 32 kbps ADPCM. Finally, at step S142, the switch that is lighting on at present is turned off, and the switch 151b is turned on to terminate the processing. At step S143, it is examined whether or not the current transfer rate mode is 2B. If it is 2B, the procedure proceeds to step S139, while if it is not 2B, the processing proceeds to step S138. At step S144, the BAS code of 64 kbps PCM audio is notified to the multiplex/separation unit 17 to initiate the mode changeover procedure. Next, at step S145, the selection of 64 kbps PCM encode is notified to the audio encode/decode unit 6 to perform the subsequent audio encode with the 64 kbps PCM, and then the procedure proceeds to step S142.

At step S152, it is examined whether or not the switch 151d is lighting on at present, and if it is lighting on, the processing is terminated. If it is not lighting on, the procedure proceeds to step S153. At step S153, it is examined whether or not the transfer rate ability is 2B with the ability exchanged in the ability exchange procedure. If it is 2B, the procedure proceeds to step S154, while if it is not 2B, the processing is terminated. At step S154, the number of channels being used at present is investigated, and if the used channel number is 2, the procedure proceeds to step S163, and if it is not 2, the procedure proceeds to step S155. At step S155, the setting of new additional channel is notified to the line interface unit 18 to initiate the call setting procedure. At step S156, it is examined whether or not the call setting is completed normally, based on a notification from the line interface unit 18, and if it has been completed normally, the procedure proceeds to step S157, or if the call setting has failed, the processing is terminated. At step S157, the used channel number is set to 2. At step S158, the BAS code of transfer rate mode 2B is notified to the multiplex/separation unit 17 to initiate the mode changeover procedure. At step S159, it is examined whether or not the 8 kbps audio communication is capable with the ability exchanged in the ability exchange procedure. If it is not capable, the procedure proceeds to step S164, or if it is capable, the procedure proceeds to step S160. At step S160, the BAS code of 8 kbps audio is notified to the multiplex/separation unit 17 to initiate the mode changeover procedure. Next, at step S161, the selection of 8 kbps APCAB encode is notified to the audio encode/decode unit 6 to perform the subsequent audio encode with the 8 kbps APCAB. Finally, at step S162, the switch that is lighting on at present is turned off, and the switch 151b is turned on to terminate the processing. At step S163, it is examined whether or not the current transfer rate mode is 2B. If it is 2B, the procedure proceeds to step S159, while if it is not 2B, the processing proceeds to step S158. At step S164, it is examined whether or not the 16 kbps audio communication is capable with the ability exchanged in the ability exchange procedure. If it is not capable, the procedure proceeds to step S167, or if it is capable, the procedure proceeds to step S165. At step S165, the BAS code of 16 kbps audio is notified to the multiplex/separation unit 17 to initiate the mode changeover procedure. Next, at step S166, the selection of 16 kbps APCAB encode is notified to the audio encode/decode unit 6 to perform the subsequent audio encode with the 16 kbps APCAB, and then the procedure proceeds to step S162. At step S167, it is examined whether or not the switch 151c is lighting on, and if it is lighting on, the processing is terminated. And if it is not lighting on, the procedure proceeds to step S139 of FIG. 5C.

The above example only deals with the ISDN basic interface, however, it also applicable to a primary group of interfaces.

Also, the above example has only four kinds of transfer rates selectable, but is available with more kinds of transfer rates.

Further, the above example does not deal with a case where data is transferred together with audio and image, but even when data is transferred concurrently, the relation between the number of channels, the audio transfer rate and the image transfer rate is the same as in this example.

As above described, the first example provides a multi-media communication terminal device for communicating a plurality of media such as dynamic or still picture image, audio or data, in a combination thereof, via a communication line between remote sites, having image transmission/reception means for transmitting and receiving the image at a plurality of transmission rates, audio transmission/reception means for transmitting and receiving the audio at a plurality of transmission rates, and data transmission/reception means for transmitting and receiving data at a plurality of transmission rates, wherein by providing operation means for specifying the transmission rate of image, and system control means for selecting an optimal audio encode system from the transmission rate of a specified image and the transmission rate of a current channel, or for setting a new call when the optimal audio encode, corresponding to the transmission rate of the specified image, does not exist in the partner's audio ability, the transmission rate of image desired by the operator can be specified and the efficient utilization of channels is allowed. Also, as system control means is provided for freeing excess channels when a plurality of channels are provided and the transmission rate of specified image is low, there is an effect of reducing the communication fee because excess channels can be freed when the transmission rate of an image is selected at a low rate.

The first example as described is one in which the channel is added or disconnected by determining the audio transfer rate in accordance with the image transfer rate selected among a plurality of image transfer rates, a second example as described below is one in which the channel is automatically set or disconnected depending on the transfer rate ability specified (maximum number of communication capable of channels) and the transfer mode (number of channels for practical use with the communication).

(Second example)

The constitution of a multi-media communication device in the second example is the same as that shown in FIG. 1, and the operation procedure performed at the start of communication between terminals is the same as that shown in FIG. 4, and so the explanation will be omitted.

Figure 6:
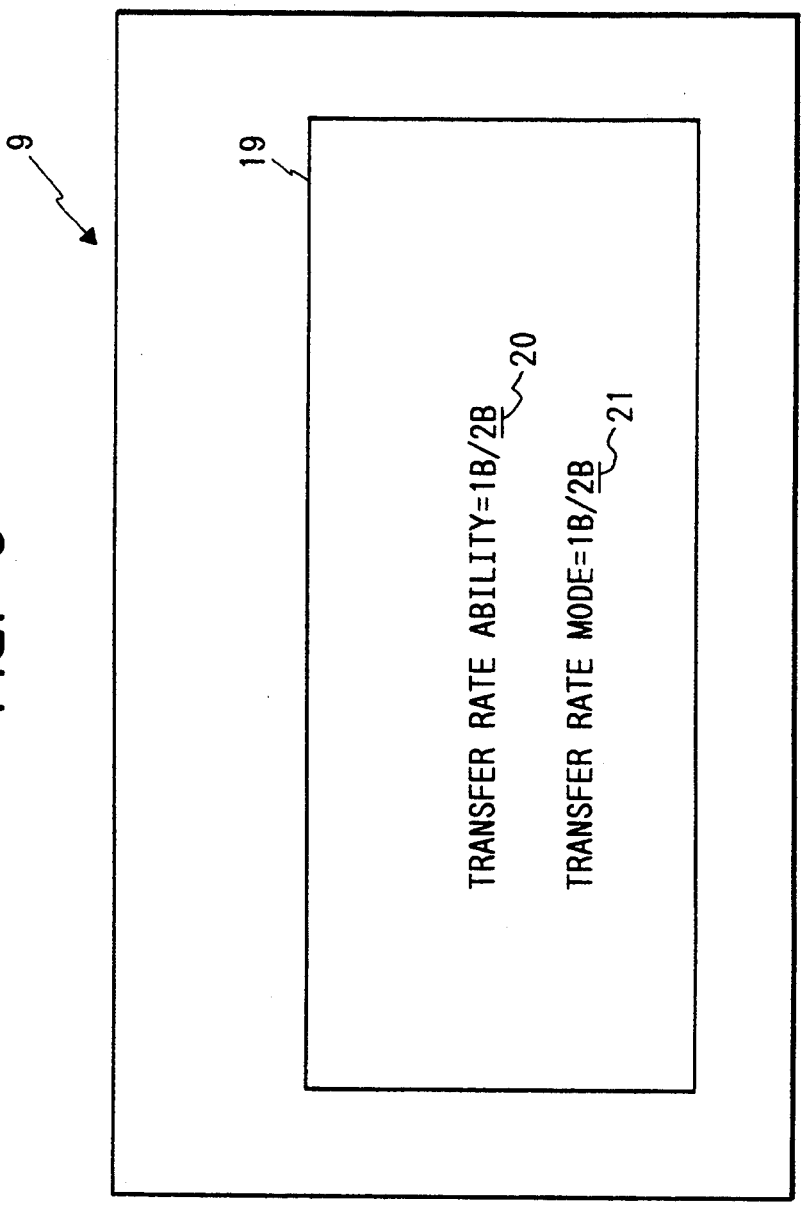
FIG. 6 is a front view showing one example of a display unit in the multi-media communication terminal in the second to fifth examples.

FIG. 6 is a front view of a display unit 9 in the second example, in which the display unit 9 is provided with a display screen 19 in its almost central portion. In the display screen 19, the transfer rate ability and the transfer rate mode are displayed, and can be specified by moving a first cursor 20 and a second cursor 21 with the manipulation of an operation unit 15. In this example, it is indicated that the transfer rate ability and the transfer rate mode are usable with both 1B and 2B. Also, it is indicated that the transfer rate ability is currently specified as 2B, with the first cursor.

Also, the transfer rate mode can be specified within a range of transfer rate ability 2B as above specified. That is, as the transfer rate ability is currently set at 2B, the transfer rate mode can be selected from 1B and 2B. In this example, the transfer rate mode is currently specified as 2B, with the second cursor 21.

Also, in this example, the transfer rate of audio, data and image can be automatically set depending on whether the selected transfer rate mode is 1B or 2B.

Figure 7B:
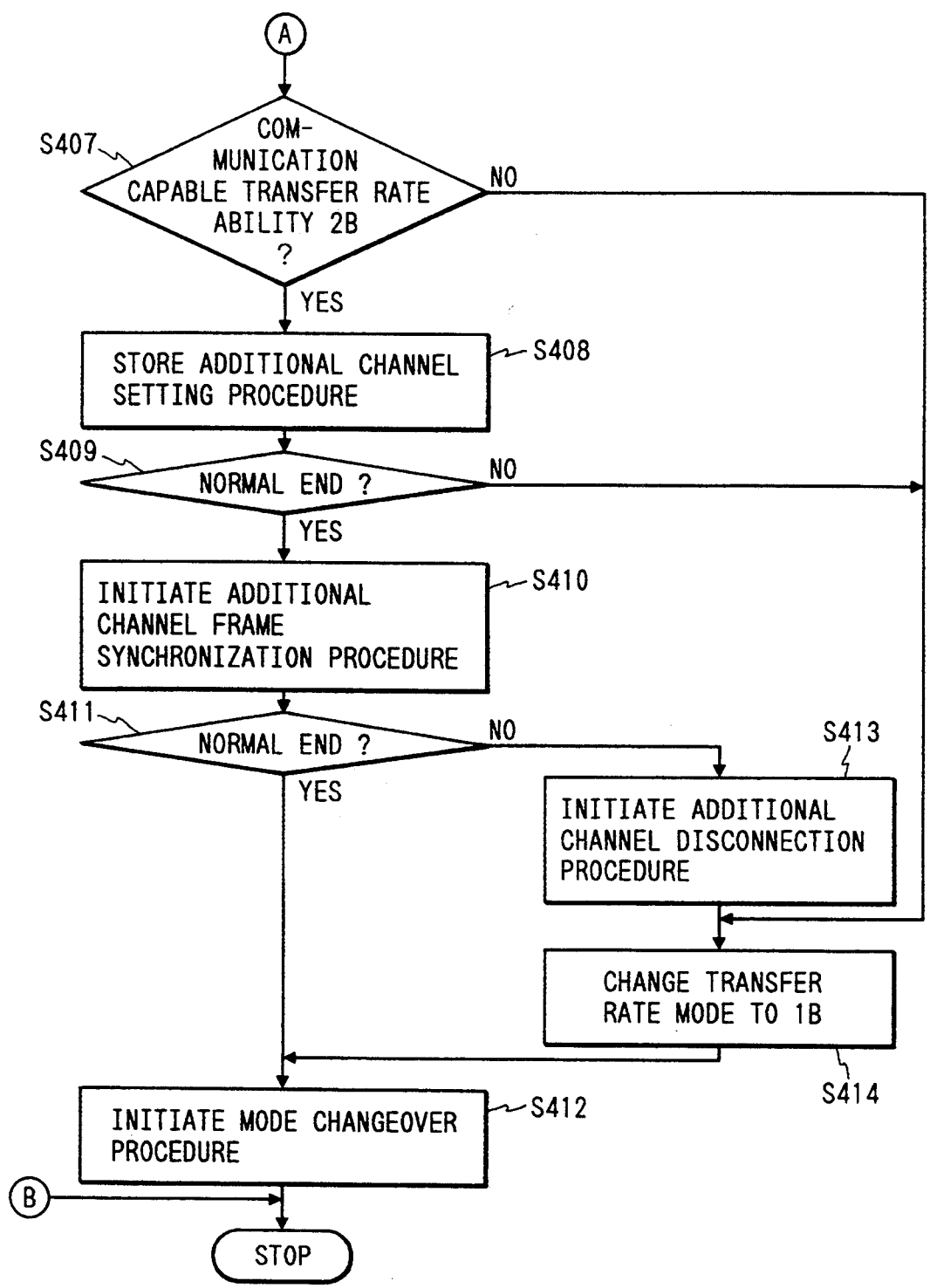

FIGS. 7A and 7B are flowcharts showing a control procedure in the system control unit 16 on the transmission side of the multi-media communication terminal according to the second example, wherein the transfer rate ability and the transfer rate mode at the start of communication have been specified at 2B with the first cursor 20 and the second cursor 21, respectively.

In FIG. 7A, firstly, the initial channel setting procedure is initiated (step S400). That is, the execution of the call setting procedure on the D channel is notified to the line interface unit 18, based on the dial information of partner's communication terminal input from the operation unit 15. Next, it is determined whether or not the call setting procedure on the line interface unit 18 has been normally ended (step S401). If it is determined that it has not normally ended, the processing is immediately terminated, because the setting of initial channel has failed (FIG. 7B). On the other hand, if it is determined that it has normally ended, the execution of the frame synchronization procedure on the initial channel that has been set is notified to the multiplex/separation unit 17 (step S402).

Next, it is determined whether or not the synchronization procedure on the multiplex/separation unit 17 has normally ended (step S403). If it is determined that it has not normally ended, the communication is judged as impossible because of the failure of synchronization, and the execution of the call disconnection procedure for freeing the initial channel that has been set is notified to the line interface unit 18 (step S404), and the processing is terminated. On the other hand, if it is determined that it has normally ended, the execution of the ability exchange procedure with its own terminal ability being currently set is notified to the multiplex/separation unit 17 (step S405).

Next, the communication capable ability is determined from the partner's terminal ability and its own terminal ability, based on a result of the ability exchange from the multiplex/separation unit 17, and stored together with the partner's terminal ability in a RAM (step S406).

After the communication capable ability has been thus determined and stored, the control procedure of FIG. 7B is executed. That is, it is determined whether or not the transfer rate ability among the communication capable ability determined is 2B (step S407), and if the transfer rate ability is 2B, the execution of the call setting procedure for setting the additional channel is notified to the line interface unit 18 (step S408).

Next, it is determined whether or not the call setting procedure in the line interface unit 18 has normally ended (step S409). If the normal end is determined, the execution of the frame synchronization procedure on the additional channel being set is notified to the multiplex/separation unit 17 (step S410).

Next, it is determined whether or not the synchronization procedure in the multiplex/separation unit 17 has normally ended (step S411). If the normal end is determined, the mode changeover procedure is initiated at step S412 to change the transfer rate mode to 2B and terminate the changeover processing. On the other hand, if the normal end is not determined, the communication is determined as impossible because the synchronization of additional channel has failed, the execution of the call disconnection procedure for freeing the additional channel being set is notified to the line interface unit 18 (step S413), the transfer rate mode specified on the display screen 19 is changed to 1B (step S414), the execution of the mode changeover procedure to the transfer rate mode 1B is notified to the multiplex/separation unit 17 (step S412), and the processing is terminated.

At step S407, if the communication capable transfer rate ability is not determined as 2B (i.e., 1B), and if the normal end is not determined at step S409 to fail in the setting of additional channel, the transfer rate mode is changed to 1B (step S414), the mode changeover procedure is initiated (step S412) as above described, and the processing is terminated.

Note that if the mode received from the partner's communication terminal is notified from the multiplex/separation unit 17 in a process from step S407 to step S412, it is stored in the RAM as the communication mode of partner's communication terminal.

In the second example as above described, the initial channel is set, and the setting of an additional channel can be automatically performed after the ability exchange with the partner's communication terminal, in which in setting the additional channel, the operator does not need to manually operate the operation unit as conventionally practiced, and a desired multi-media communication is enabled promptly and smoothly.

(Third example)

FIG. 8 is a flowchart showing a control procedure in the system control unit 16 on the transmission side of a multi-media communication terminal according to the third example, wherein when the communication is being performed at a transfer rate mode of 2B on the transmission side by the use of the additional channel, the additional channel can be deleted by changing the transfer rate mode on the transmission side to 1B.

First, the operator manipulates the operation unit 15 to move the second cursor 21 on the display screen 19 (see FIG. 6) and change the transfer rate mode from 2B to 1B (step S500). Next, the execution of the mode changeover procedure for changing the mode from 2B to 1B is notified to the multiplex/separation unit 17 (step S501). Next, it is examined whether or not the transfer rate mode of partner's communication terminal (reception-side) stored with the execution of the mode changeover procedure is 1B (step S502). And if the transfer rate mode on the reception side is 1B, it is determined whether or not the additional channel being currently set has been set on its own communication terminal side (step S503). If its own communication terminal is on the side of setting the additional channel, the execution of the call disconnection procedure for freeing the additional channel being set is notified to the line interface unit 18 (step S504), and the processing is terminated.

On the other hand, at step S502, if the transfer rate mode on the reception side is not 1B, the processing is immediately terminated. Also, if the own communication terminal is not on the side of setting the additional channel at step S503, the processing is immediately terminated because the additional channel has been set by the partner's communication terminal.

In the third example as above described, when the transfer rate mode is changed from 2B (first transfer rate mode) to 1B (second transfer rate mode) during the communication, an unused additional channel can be automatically disconnected, so that the operator can perform a desired multi-media communication promptly and smoothly.

(Fourth example)

Figure 9:
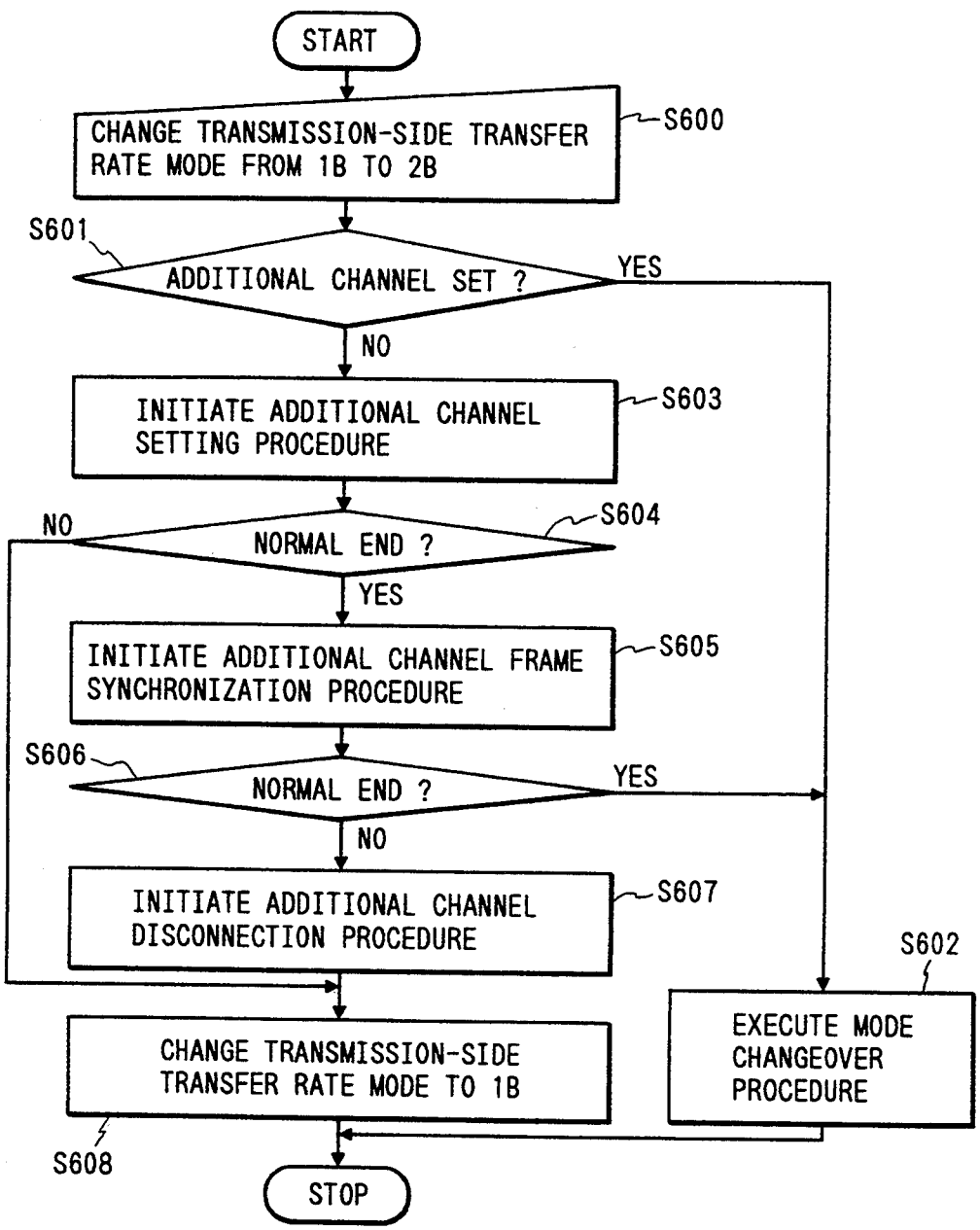
FIG. 9 is a flowchart showing a control procedure in the third example.

FIG. 9 is a flowchart showing a control procedure in the system control unit 16 on the transmission side of a multi-media communication terminal according to the fourth example, wherein when the communication is being made at a transfer rate mode of 1B on the transmission side, the additional channel is added by changing the transfer rate mode on the transmission side to 2B.

First, the operator manipulates the operation unit 15 to move the second cursor 21 on the display screen 19 (see FIG. 6) and change the transfer rate mode from 1B to 2B (step S600).

Next, it is determined whether or not the additional channel has been set (step S601). If the additional channel has been set, the execution of the mode changeover procedure for changing the transfer rate mode on the transmission side from 1B to 2B is notified to the multiplex/separation unit 17 (step S602), and the processing is terminated.

On the other hand, if the additional channel has not been set, the execution of the call setting procedure for setting the additional channel is notified to the line interface unit 18 (step S603), and it is determined whether or not the call setting procedure with the line interface unit 18 has normally ended (step S604). If the abnormal end is determined, the procedure proceeds to step S608 because the setting of additional channel has failed, and the transfer rate mode on the transmission side is returned to 1B and the processing is terminated. On the other hand, if the normal end is determined, the execution of the frame synchronization procedure on the additional channel being set is notified to the multiplex/separation unit 17 (step S605), and then it is determined whether or not the synchronization procedure with the multiplex/separation unit 17 has normally ended (step S606). If the normal end is determined, the mode changeover procedure is executed, the transfer rate mode is changed from 1B to 2B (step S602), and the processing is terminated. On the other hand, if the abnormal end is determined, the communication is judged as impossible because the synchronization of additional channel has failed, the execution of the call disconnection procedure for freeing the additional channel being set is notified to the line interface unit 18 (step S607), the transfer rate mode on the transmission side is returned to 1B (step S608), and the processing is terminated.

In the fourth example as above described, when the transfer rate mode is changed from 1B (first transfer rate mode) to 2B (second transfer rate mode) during the communication, the additional channel can be automatically added, so that the operator can perform a desired multi-media communication promptly and smoothly.

(Fifth example)

Figure 10:
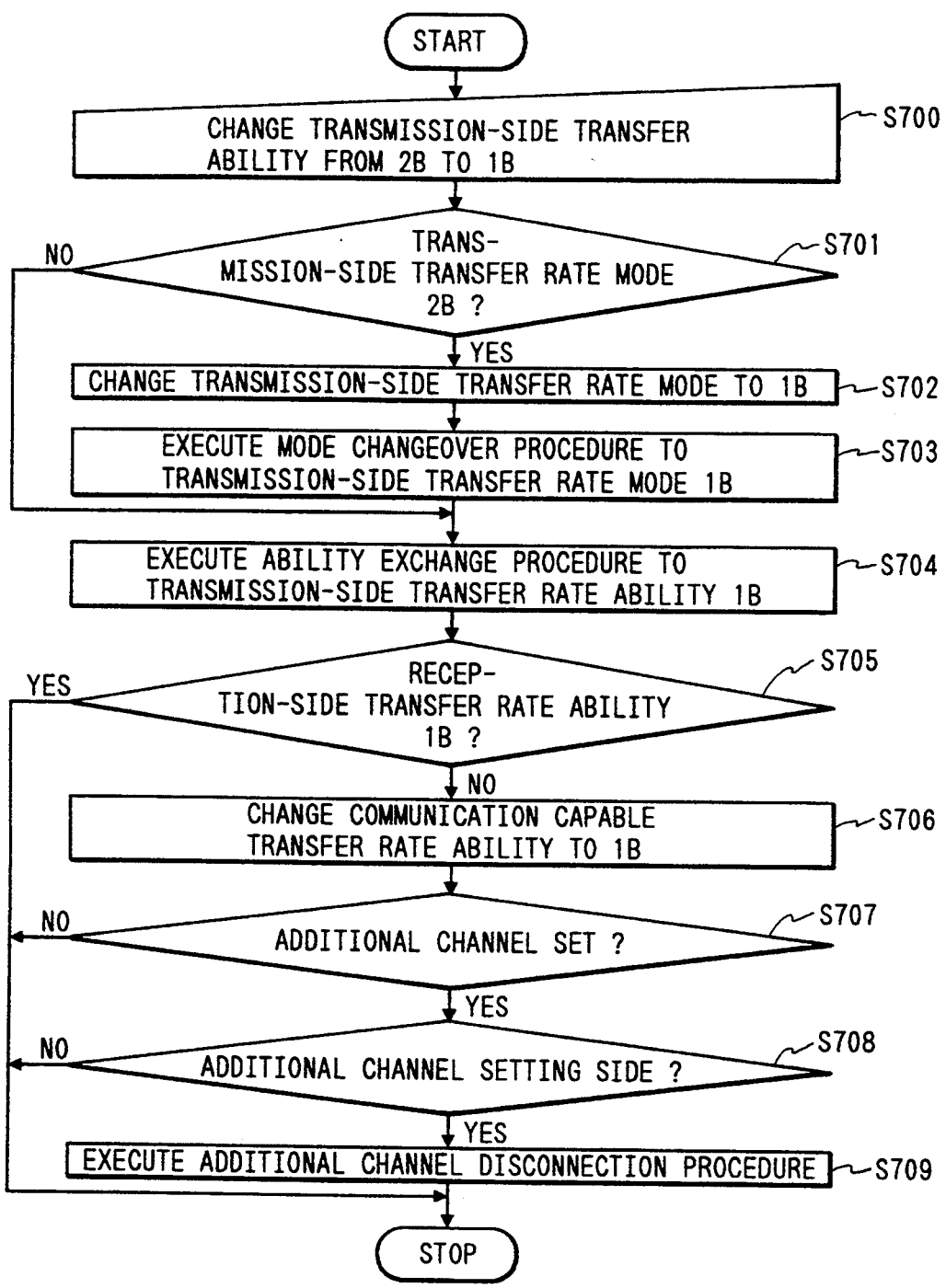
FIG. 10 is a flowchart showing a control procedure in the fourth example.

FIG. 10 is a flowchart showing a control procedure in the system control unit 16 on the transmission side of a multi-media communication terminal according to the fifth example, wherein when the communication is being made a transfer rate ability of 2B on the transmission side, the additional channel is deleted by changing the tranfer rate ability on the transmission side to 1B.

First, the operator manipulates the operation unit 15 to move the cursor 20 on the display screen 19 (see FIG. 6) and change the transfer rate ability from 2B to 1B (step S701).

Next, it is determined whether or not the transfer rate mode on the transmission side is 2B at present (step S701). If it is determined that the transfer rate mode on the transmission side is 2B, the transfer rate mode on the transmission side being currently specified on the display screen 19 is changed to 1B (step S702), the execution of the mode changeover procedure for changing the transfer rate mode on the transmission side from 2B to 1B is notified to the multiplex/separation unit 17 (step S703), and the execution of the ability exchange procedure for changing the transfer rate ability on the transmission side from 2B to 1B is notified to the multiplex/separation unit 17 (step S704). On the other hand, at step S701, if it is determined that the transfer rate mode on the transmission side is not 2B, the procedure directly proceeds to step S704 because the transfer rate mode on the transmission side is 1B, and the execution of the ability exchange procedure for changing the transfer rate ability on the transmission side to 1B is notified to the multiplex/separation unit 17.

Next, it is determined whether or not the transfer rate ability on the reception side stored with the execution of the ability exchange procedure is 1B (step S705). If the transfer rate ability on the reception side is 1B, the transfer rate abilities on the transmission and reception sides can coincide, and the processing is immediately terminated. On the other hand, if the transfer rate ability on the reception side is not 1B but 2B, the communication capable transfer rate ability stored is changed from 2B to 1B (step S706), and it is determined whether or not there is any additional channel set at present (step S707). If it is determined that there is no additional channel set, then the processing is immediately terminated. If there is any additional channel set, then it is determined whether or not the additional channel has been set on the own communication terminal side (step S708). If the additional channel has been set on the partner's communication terminal side, the processing is immediately terminated, while if the own communication terminal is on the side of setting the additional channel, the execution of the call disconnection procedure for freeing the additional channel being set is notified to the line interface unit 18 (step S709), and the processing is terminated.

In the fifth example as above described, when the transfer rate ability is changed from 2B (first transfer rate ability) to 1B (second transfer rate ability) during the communication, the transfer rate mode is automatically adjusted to 1B, and further unused additional channel can be automatically disconnected, so that the operator can perform a desired multi-media communication promptly and smoothly.

Figures 2, 11A:
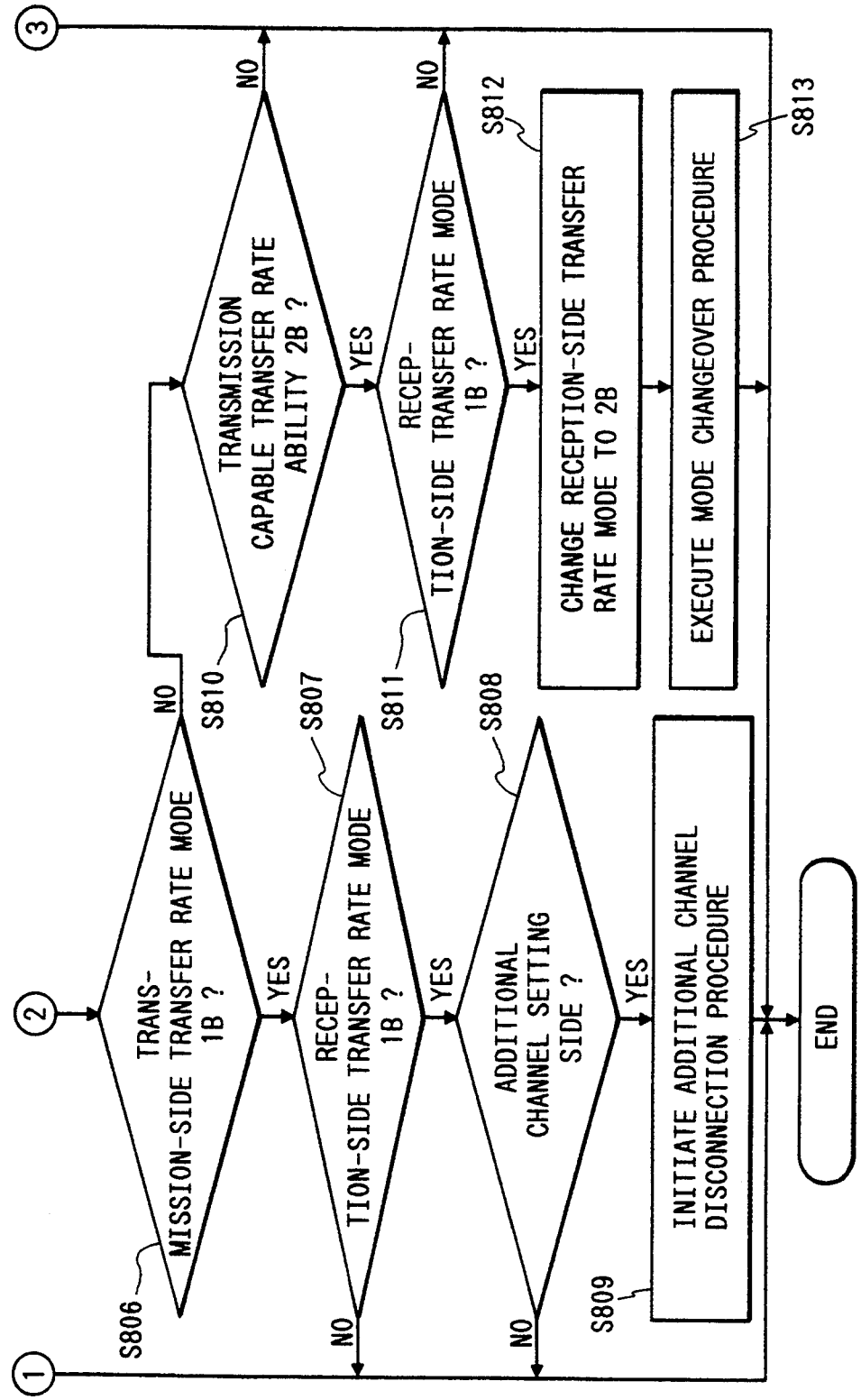

FIGS. 11A and 11B are flowcharts of a control procedure in the system control unit 16 on the reception side, showing a processing of the command reception from the multiplex/separation unit 17, when the signal information from the communication terminal on the transmission side is received by the multiplex/separation unit 17.

In FIG. 11A, if a command is received from the multiplex/separation unit 17, a determination is made whether or not the received command is an in-channel (B channel) command for notifying the mode or ability (step S801). If it is not determined as the in-channel command, the processing for receiving the other command (e.g., the error information due to the failure of frame synchronization) is executed (step S802), and the processing is terminated. On the other hand, if it is determined as the in-channel command, a determination is made whether or not the received command (BAS) is a transfer rate mode command (step S803), and if it is determined as the transfer rate mode command, a determination is made whether or not the received transfer rate mode is the same as the transfer rate mode on the transmission side currently stored (step S804), and if it is the same, the processing is terminated. On the other hand, if it is not the same as the transfer rate mode on the transmission side, the transfer rate mode on the transmission side which is stored is changed to the transfer rate mode received (step S805). Next, a determination is made whether or not the transfer rate mode on the transmission side changed is 1B (step S806). If it is determined that the transfer rate mode on the transmission side is 1B, a determination is made whether or not the own transfer rate mode (reception side) is 1B (step S807). If the transfer rate mode on the reception side is not 1B, the processing is immediately terminated. On the other hand, if the transfer rate mode on the reception side is 1B, a determination is made whether or not the additional channel currently set has been set on the own communication terminal side (reception side) (step S808). If the additional channel is not set on the reception-side communication terminal, the processing is immediately terminated because the transmission-side communication terminal is on the additional channel setting side. On the other hand, if the reception-side communication terminal is on the additional channel setting side, the execution of the call disconnection procedure for freeing the additional channel set (CCITT recommendation I series) is notified to the line interface unit 18 (step S809), and the processing is terminated.

On the other hand, at step S806, if it is determined that the transfer rate mode on the transmission side is not 1B, a determination is made whether or not the communication capable transfer rate ability stored is 2B (step S810). If the communication capable transfer rate ability is not 2B (i.e., 1B), the processing is immediately terminated, while if the communication capable transfer rate ability is 2B, a determination is made whether or not the transfer rate mode on the reception side is 1B (step S811). If the reception transfer rate mode is not 1B (i.e., 2B), the processing is immediately terminated, while if the transfer rate mode on the reception side is 1B, the transfer rate mode on the reception side is changed from 1B to 2B (step S812), the execution of the mode changeover procedure for changing the transfer rate mode on the reception side from 1B to 2B is notified to the multiplex/separation unit 15 (step S813), and the processing is terminated.

However, if it is determined that the in-channel command received at step S803 is not the transfer rate command, the control procedure as shown in FIG. 11B is executed.

That is, a determination is made whether or not the received command is a terminal ability command (step S814). If the reception command is not the terminal ability command, the reception processing for other mode commands such as audio decode or data rate is executed (step S815), and the processing is terminated. On the other hand, if it is determined that the received in-channel command is a terminal ability command, a determination is made whether or not the terminal ability command is a transfer rate ability command (step S816). If it is not determined as the transfer rate ability command, it is judged as another ability command such as audio and data, the reception processing of these terminal ability commands is executed (step S817), and the processing is terminated. Also if it is determined as the transfer rate ability, a determination is made whether or not the received transfer rate ability command is the same as the transfer rate ability on the transmission side which is stored (step S818), and if it is the same, the processing is terminated, while if it is not the same, the transfer rate ability on the transmission side which is stored is changed so that the transfer rate abilities on the transmission and reception sides can be the same (step S819).

Next, a new communication capable transfer rate ability is determined from the transfer rate ability on the transmission side and the transfer rate ability on the reception side (step S820), and then, a determination is made whether or not the newly determined communication capable transfer rate ability is 1B (step S821). If the communication capable transfer rate ability is not 1B (i.e., 2B), the processing is immediately terminated, while if it is 1B, a determination is made whether or not the transfer rate mode on the reception side is 1B (step S822). If the transfer rate mode on the reception side is 1B, the processing is immediately terminated, while if it is not 1B (i.e., 2B), the transfer rate mode on the reception side is changed to 1B (step S823), and then the execution of the mode changeover procedure for changing the transfer rate mode on the reception side to 1B is notified to the multiplex/separation unit 17.

Thereafter, a determination is made whether or not there is any additional channel set (step S825), and if there is no additional channel set, the processing is immediately terminated. Also, if there is any additional channel set, a determination is made whether or not its own communication terminal is on the additional channel setting side (step S826), and if it is not on the additional channel setting side, the processing is immediately terminated, while if its own communication terminal is on the additional channel setting side, the call disconnection procedure of additional channel is executed (step S827), and the processing is terminated.

Note that the present invention is not limited to the above examples, but can be changed without departing from the scope of the invention.

The above examples were described with the ISDN basic interface (2B+D), but are also applicable to a primary group of interfaces such as (23B+D). Also in the above examples, the additional channel to be disconnected at the specification of low transfer rate ability or transfer rate mode was only the additional channel set by the own communication terminal, but they can be configured such that the additional channel set by the partner's communication terminal can be also disconnected, or either of them can be selected to disconnect the additional channel.

As above detailed, the multi-media communication terminal in the second example has specification means for specifying a plurality of transfer rate abilities and a plurality of transfer rate modes, and call setting means for automatically setting the additional channel after setting of the initial channel when the transfer rate ability having a predetermined ability greater than or equal to 2B is specified by the specification means, so that the setting of additional channel can be made promptly and easily without the operator performing any complex call control procedure.

Also, the multi-media communication terminal in the third example has the specification means as above mentioned, and specification means for specifying a plurality of transfer rate abilities and a plurality of transfer rate modes, wherein it comprises call disconnection means for automatically disconnecting the unused additional channel when a first transfer rate mode specified by the specification means is changed to a second transfer rate mode smaller than the first transfer rate mode during the communication by the specification means, so that the excess additional channels can be freed promptly and easily without the operator performing any complex call control procedure.

Further, the multi-media communication terminal in the fourth example has the specification means as above mentioned, and further comprising call additional setting means for automatically adding the additional channel when a first transfer rate mode specified by the specification means is changed to a second transfer rate mode larger than the first transfer rate mode during the communication by the specification means, so that the additional channel can be added promptly and easily without the operator performing any complex call control procedure.

Also, the multi-media communication terminal in the fifth example has the specification means as above mentioned, and further comprising change/disconnection means which when a first transfer rate ability specified by the specification means is changed to a second transfer rate ability smaller than the first transfer rate ability during the communication by the specification means, automatically disconnects the call of unused additional channel, as well as automatically changing the transfer rate mode to that corresponding to the second transfer rate ability, so that the excess additional channel can be freed by changing the transfer rate mode to that corresponding to the transfer rate ability promptly and easily without the operator performing any complex call control procedure.

In this way, with the second to fifth examples as above described, the additional channel can be automatically set or freed in accordance with the transfer rate ability and transfer rate mode specified, whereby it is possible to provide a multi-media communication terminal comprising a more excellent user interface suitable for the operator. As the excess additional channel can be automatically freed, the communication fee can be reduced.

While the preferred examples of the present invention were described, the present invention is not limited to the above-described examples, but various variations can be made within a scope as defined in the claim.

What is claimed is:

1. A multi-media communication terminal device comprising:
   image information communication means for communicating image information at one of a plurality of image transmission rates to a partner communication terminal device;

audio information communication means for communicating audio information at one of a plurality of audio transmission rates to the partner communication terminal device;

selection means for selecting one of the plurality of image transmission rates; and control means for selecting from among the plurality of audio transmission rates the optimal audio transmission rate in accordance with the image transmission rate selected by said selection means.

2. A device according to claim 1, wherein said audio information communication means has a plurality of audio encode means.

3. A device according to claim 2, wherein said control means selects one of said plurality of audio encode means to determine the audio transmission rate.

4. A multi-media communication terminal device according to claim 1, wherein said multi-media communication terminal device is connected to the partner communication terminal device via an integrated services digital network.

5. A multi-media communication terminal device according to claim 4, further comprising means for exchanging an ability of said multi-media communication terminal device for enabling a communication with the partner communication terminal device, and for determining the number of communication channels for use in the communication.

6. A multi-media communication device comprising:

image communication means for communicating an image at one of a plurality of image transmission rates to a partner communication device;

selection means for selecting one of the plurality of image transmission rates;

set means for setting one or a plurality of communication channels between said multi-media communication device and the partner communication device, each communication channel accommodating a predetermined image transmission rate;

determining means for determining, when the image transmission rate has been selected by said selection means, whether a superfluous channel has been set by a previous operation of said set means, or whether the number of the previously set communication channels is insufficient for image communication at the selected image transmission rate; and control means for controlling said set means to release the superfluous channel if it has been determined by said determining means that the superfluous channel has been previously set, and for controlling the set means to set a new communication channel if it has been determined by said determining means that the number of previously set channels is insufficient for image communication at the selected image transmission rate.

7. A device according to claim 6, further comprising audio communication means for communicating audio information at one of a plurality of audio transmission rates, and wherein said control means determines the audio transmission rate of audio information on the basis of the image transmission rate selected by said selection means.

8. A multi-media communication device comprising:

multi-media communication means for communicating a plurality of media information in a combination thereof to a partner communication device;

selection means for selecting either one of a first mode and a second mode, the first mode entailing setting a first communication channel between said multi-media communication device and the partner communication device and the second mode entailing setting the first communication channel and a second communication channel between said multi-media communication device and the partner communication device; and control means for automatically setting, if the first communication channel has been previously set between said multi-media communication device and the partner communication device, the second communication channel in addition to the first communication channel, if the second mode is selected by said selection means.

9. A device according to claim 8, further comprising means for determining the number of the communication channels capable of performing a communication of the media information, and for exchanging the number determined with the partner communication device.

10. A device according to claim 8, wherein said control means disconnects the second communication channel if the first mode is selected by said selection means during the performing of communication by said multi-media communication means in the second mode.

11. A multi-media communication device comprising:

multi-media communication means for communicating a plurality of media information in a combination thereof to a partner communication device;

selection means for selecting either one of a first mode and a second mode, the first mode entailing setting a first communication channel between said multi-media communication device and the partner communication device and the second mode entailing setting the first communication channel and a second communication channel between said multi-media communication device and the partner communication device; and control means for setting, if the second mode is selected by said selection means, the first and second communication channels between said multi-media communication means and the partner communication device, wherein said control means disconnects the second communication channel if the first mode is selected by said selection means during the performing of communication by said multi-media communication means in the second mode.

12. A multi-media communication device comprising:

multi-media communication means for communicating a plurality of media information in a combination thereof to a partner communication device;

selection means for selecting either one of a first mode and a second mode, the first mode entailing setting a first communication channel between said multi-media communication device and the partner communication device and the second mode entailing setting the first communication channel and a second communication channel between said multi-media communication device and the partner communication device; and control means for setting, if the first mode is selected by said selection means, the first communication channel between said multi-media communication device and the partner communication device, wherein said control means sets the second communication channel in addition to the first communication channel if the second mode is selected by said selection means during the performing of communication by said multi-media communication means in the first mode.

13. A method on a multi-media communication terminal device comprising:
- communicating image information at one of a plurality of image transmission rates to a partner communication terminal device;
- communicating audio information at one of a plurality of audio transmission rates to the partner communication terminal device;
- selecting one of the plurality of image transmission rates; and
- selecting from among the plurality of audio transmission rates the optimal audio transmission rate in accordance with the image transmission rate selected by said selection means, 14. A method on a multi-media communication device comprising the steps of:
- communicating an image at one of a plurality of transmission rates to a partner communication device;
- selecting one of the plurality of transmission rates;
- setting one or a plurality of communication channels between the multi-media communication device and the partner communication device, each communication channel accommodating a predetermined transmission rate;
- determining, when the transmission rate has been selected by said selecting step, whether a superfluous channel has been set by a previous operation of said setting step, or whether the number of the previously set communication channels is insufficient for image communication at the selected transmission rate; and
- controlling said setting step to release the superfluous channel if it has been determined by said determining step that the superfluous channel has been previously set, and for controlling the setting step to set a new communication channel if it has been determined by said determining step that the number of previously set channels is insufficient for image communication at the selected transmission rate.

15. A multi-media communication method on a multi-media communication device for communicating a plurality of media information in a combination thereof to a partner communication device, said method comprising the steps of:
- selecting either one of a first mode and a second mode, the first mode entailing setting a first communication channel between the multi-media communication device and the partner communication device and the second mode entailing setting the first communication channel and a second communication channel between the multi-media communication device and the partner communication device; and
- automatically setting, if the first communication channel has been previously set between the multi-media communication device and the partner communication device, the second communication channel in addition to the first communication channel, if the second mode is selected by said selecting step.

16. A multi-media communication method on a multi-media communication device for communicating a plurality of media information in a combination thereof to a partner communication device, said method comprising the steps of:
- selecting either one of a first mode and a second mode, the first mode entailing setting a first communication channel between the multi-media communication device and the partner communication device and the second mode entailing setting the first communication channel and a second communication channel between the multi-media communication device-and the partner communication device; and
- setting, if the second mode is selected by said selecting step, the first and second communication channels between the multi-media communication device and the partner communication device, wherein said setting step disconnects the second communication channel if the first mode is selected by said selecting step during the performing of communication by the communication device in the second mode.

17. A multi-media communication method on a multi-media communication device for communicating a plurality of media information in a combination thereof to a partner communication device, said method comprising the steps of:
- selecting either one of a first mode and a second mode, the first mode entailing setting a first communication channel between the multi-media communication device and the partner communication device and the second mode entailing setting the first communication channel and a second communication channel between the multi-media communication device and the partner communication device; and
- setting, if the first mode is selected by said selecting step, the first communication channel between the multi-media communication device and the partner communication device, wherein said setting step sets the second communication channel in addition to the first communication channel if the second mode is selected by said selecting step during the performing of communication by the multi-media communication device in the first mode.

* * * * *

UNITED STATES PATENT AND TRADEMARK OFFICE
CERTIFICATE OF CORRECTION

PATENT NO. : 5,392,284

DATED : February 21, 1995

INVENTOR : AKIRA SUGIYAMA

It is certified that error appears in the above-identified patent and that said Letters Patent is hereby corrected as shown below:

ON THE TITLE PAGE

At [57] Abstract

Line 8, "rates" should read --rates,--.

COLUMN 4

Line 16, "3'" should read --3,--.

COLUMN 6

Line 65, "numeral" should read --numerals--.

COLUMN 11

Line 9, "interface," should read --interface;-- and "it" should read --it is--.

COLUMN 15

Line 64, "11B" should read --11B--.

COLUMN 16

Line 67, "1 1B" should read --11B--.

UNITED STATES PATENT AND TRADEMARK OFFICE
CERTIFICATE OF CORRECTION

PATENT NO. : 5,392,284

DATED : February 21, 1995

INVENTOR : AKIRA SUGIYAMA

It is certified that error appears in the above-identified patent and that said Letters Patent is hereby corrected as shown below:

<u>COLUMN 22</u>

Line 23, "device-and" should read --device and--.

Signed and Sealed this

Sixteenth Day of May, 1995

Attest:

BRUCE LEHMAN

Attesting Officer     Commissioner of Patents and Trademarks